United States Patent
Yamamoto

(10) Patent No.: US 10,027,956 B2
(45) Date of Patent: Jul. 17, 2018

(54) IMAGE DECODING DEVICE, IMAGE ENCODING DEVICE, AND DATA STRUCTURE OF ENCODED DATA

(75) Inventor: Tomoyuki Yamamoto, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 93 days.

(21) Appl. No.: 14/003,686

(22) PCT Filed: Mar. 7, 2012

(86) PCT No.: PCT/JP2012/055805
§ 371 (c)(1),
(2), (4) Date: Sep. 6, 2013

(87) PCT Pub. No.: WO2012/121284
PCT Pub. Date: Sep. 13, 2012

(65) Prior Publication Data
US 2013/0343455 A1    Dec. 26, 2013

(30) Foreign Application Priority Data

Mar. 10, 2011   (JP) ................... 2011-053611

(51) Int. Cl.
*H04N 7/26* (2006.01)
*H04N 19/44* (2014.01)
(Continued)

(52) U.S. Cl.
CPC ..... *H04N 19/00533* (2013.01); *H04N 19/119* (2014.11); *H04N 19/122* (2014.11);
(Continued)

(58) Field of Classification Search
None
See application file for complete search history.

(56) References Cited

U.S. PATENT DOCUMENTS

| 2009/0028239 A1* | 1/2009 | Schuur ............... H04N 19/176 375/240.03 |
| 2009/0232217 A1* | 9/2009 | Lee ...................... G06T 7/2026 375/240.16 |

(Continued)

FOREIGN PATENT DOCUMENTS

| JP | 2003-299100 A | 10/2003 |
| WO | 2010/039733 A2 | 4/2010 |

(Continued)

OTHER PUBLICATIONS

Official Communication issued in International Patent Application No. PCT/JP2012/055805, dated Jun. 5, 2012.
(Continued)

*Primary Examiner* — Andy Rao
*Assistant Examiner* — Samuel D Fereja
(74) *Attorney, Agent, or Firm* — Keating & Bennett, LLP

(57) ABSTRACT

A video image decoding device (1) is equipped with a TT information decoder (14) that, in the case where encoded data includes merge/skip information that merges or skips presence information indicating whether or not frequency-domain transform coefficients are included in the quantized transform coefficients, does not decode the presence information, and a TT information inference unit (33) that, in the case where the encoded data includes merge/skip information that merges or skips the presence information, infers the presence information. The TT information decoder (14) uses presence information inferred by the TT information inference unit (33) to decode the encoded and quantized transform coefficients.

6 Claims, 15 Drawing Sheets

(51) Int. Cl.
*H04N 19/176* (2014.01)
*H04N 19/70* (2014.01)
*H04N 19/119* (2014.01)
*H04N 19/46* (2014.01)
*H04N 19/122* (2014.01)
*H04N 19/61* (2014.01)
*H04N 19/463* (2014.01)

(52) U.S. Cl.
CPC ........... *H04N 19/176* (2014.11); *H04N 19/46* (2014.11); *H04N 19/463* (2014.11); *H04N 19/61* (2014.11); *H04N 19/70* (2014.11)

(56) References Cited

U.S. PATENT DOCUMENTS

| | | | |
|---|---|---|---|
| 2010/0086029 A1* | 4/2010 | Chen | H04N 19/176 375/240.12 |
| 2011/0032990 A1* | 2/2011 | Choi | H04N 19/176 375/240.13 |
| 2011/0038412 A1* | 2/2011 | Jung et al. | 375/240.12 |
| 2011/0103468 A1* | 5/2011 | Polisetty | G10L 25/78 375/240.03 |
| 2011/0110420 A1* | 5/2011 | Liang et al. | 375/240.03 |
| 2011/0249742 A1* | 10/2011 | Price et al. | 375/240.16 |
| 2011/0249745 A1* | 10/2011 | Chen et al. | 375/240.16 |
| 2011/0292997 A1* | 12/2011 | An et al. | 375/240.03 |
| 2012/0082213 A1* | 4/2012 | Sekiguchi et al. | 375/240.02 |
| 2012/0128260 A1* | 5/2012 | Jung et al. | 382/233 |
| 2012/0163469 A1* | 6/2012 | Kim | H04N 19/176 375/240.18 |
| 2012/0189052 A1* | 7/2012 | Karczewicz et al. | 375/240.12 |
| 2013/0051472 A1* | 2/2013 | Wiegand | H04N 19/34 375/240.16 |
| 2013/0343455 A1 | 12/2013 | Yamamoto | |
| 2014/0334535 A1* | 11/2014 | Jung | H04N 19/146 375/240.02 |

FOREIGN PATENT DOCUMENTS

| | | | |
|---|---|---|---|
| WO | WO 2010143853 A2 * | 12/2010 | ........... H04N 19/176 |
| WO | 2011/121843 A1 | 10/2011 | |
| WO | 2012/121284 A1 | 9/2012 | |

OTHER PUBLICATIONS

"Advanced video coding for generic audiovisual services, Series H: Audiovisual and Multimedia Systems, Infrastructure of audiovisual services—Coding of moving video", Recommendation ITU-T H.264, Mar. 2010, 2 pages.

Wiegand et al., "WD1: Working Draft 1 of High-Efficiency Video Coding", JCTVC-C403, Joint Collaborative Team on Video Coding (JCT-VC) of ITU-T SG16 WP3 and ISO/IEC JTC1/SC29/WG11, Output Document of JCT-VC, 3rd Meeting, Oct. 7-15, 2010, 3 pages.

Tan et al., "BoG report of CE9: Motion Vector Coding", JCTVC-D441, Joint Collaborative Team on Video Coding (JCT-VC) of ITU-T SG16 WP3 and ISO/IEC JTC1/SC29/WG11, Input Document to JCT-VC, 4th Meeting, Jan. 20-28, 2011, 4 pages.

Wang, X. et al., "LCEC Coded Block Flag Coding Under Residual Quadtree", JCT-VC of ITU-T SG16 WP3 and ISO/IEC JTC1/SC29/WG11, Document: JCTVC-D375, 4th Meeting, Jan. 20-28, 2011, WG11 No. m19152, pp. 1-2.

JCT-VC, "Test Model Under Consideration for High-Efficiency Coding (draft007)", ISO/IEC JTC1/SC29/WG11 w11280, Apr. 2010, pp. 1-152.

Official Communication issued in corresponding European Patent Application No. 12754367.6, dated Feb. 9, 2015.

Lee et al., "Improved side information signaling for quad-tree based transform structure of TMuC", Joint Collaborative Team on Video Coding (JCT-VC) of ITU-T SG16 WP3 and ISO/IEC JTC1/SC29/WG11, JCTVC-C068, Oct. 7-15, 2010, pp. 1-5.

Li, B. et al.; "Redundancy Reduction in Cbf and Merging Coding"; Joint Collaborative Team on Video Coding (JCT-VC) of ITU-T; SG16 WP3 and ISO/IEC JTC1/SC29/WG11; JCTVC-C277; Oct. 7-15, 2010; pp. 1-8.

Winken, M. et al.; "Description of Video Coding Technology Proposal by Fraunhofer HHI"; Joint Collaborative Team on Video Coding (JCT-VC) of ITU-T; SG16 WP3 and ISO/IEC JTC1/SC29/WG11; JCTVC-A116; Apr. 15-23, 2010; pp. 1-17.

* cited by examiner

FIG. 5

| coding_unit ( x0, y0, log2CUSize) { | Descriptor | |
|---|---|---|
| if( slice_type != I ) | | |
|   skip_flag | u(1) \| ae(v) | }st501 |
| if( skip_flag ) | | }st502 |
|   prediction_unit( x0, y0, Log2CUSize, Log2CUSize) | | }st503 |
| else { | | |
|   cu_merge_flag | u(1) \| ae(v) | }st504 |
| if (cu_merge_flag == 1) { | | |
|   cu_merge_left_flag | u(1) \| ae(v) | }st505 |
|   cu_merge_level | ue(v) \| ae(v) | |
| } | | |
| pred_mode | ue(v) \| ae(v) | }st506 |
| if (pred_mode == MODE_INTRA) { | | |
|   if (cu_merge_flag == 0 \|\| cu_merge_level < 1) | | }st507 |
|     intra_split_flag | u(1) \| ae(v) | |
| NumPU = derive_intra_num_pu (intra_split_flag) | | |
| Log2PUWidth = derive_intra_pu_width (log2CUSize, intra_split_flag) | | |
| Log2PUHeight = derive_intra_pu_width (log2CUSize, intra_split_flag) | | |
| } | | |
| else { // pred_mode == MODE_INTER | | |
|   if (cu_merge_flag == 0 \|\| cu_merge_level < 1) | | }st508 |
|     inter_partitioning_idc | ue(v) \| ae(v) | |
| NumPU = derive_inter_num_pu (inter_partitioning_idc) | | |
| Log2PUWidth = derive_inter_pu_width (log2CUSize, inter_partitioning_idc) | | |
| Log2PUHeight = derive_inter_pu_width (log2CUSize, inter_partitioning_idc) | | |
| } | | |
| for (i=0; i < NumPU; i++) | | |
|   prediction_unit (x0, y0, Log2PUWidth, Log2PUHeight) | | }st509 |
| transform_tree (x0, y0, log2CUSize, 0, 0) | | }st510 |
| } | | |
| } | | |

| cu_merge_flag | 0 | 1 | 1 |
|---|---|---|---|
| cu_merge_level | - | 0 | 1 |
| pred_mode | o | o | inf. |
| intra_split_flag | o | inf. | inf. |
| inter_partitioning_idc | o | inf. | inf. |
| prediction_unit() | o | o | o |
| transform_tree() | o | o | o |

(b)

| CU_merge_flag | CU_merge_level | OBJECTS TO MERGE |
|---|---|---|
| 1 | 1 | PREDICTION UNIT, TRANSFORM UNIT |
| 1 | 0 | PREDICTION UNIT |
| 0 | - | NONE |

FIG. 7

| prediction_unit(x0, y0, log2PUWidth, log2PUHeight) { | Descriptor | |
|---|---|---|
|   if( skip_flag [x0][y0] ) { | | ⎫ st701 |
|     mv_predictor () | | ⎫ st702 |
|   } else { | | |
|     if (cu_merge_flag) { | | ⎫ |
|       PUMergeFlag = cu_merge_flag | | |
|       PUMergeLeftFlag = cu_merge_left_flag | | |
|       if (PredMode == MODE_INTER) | | ⎬ st703 |
|         PUMergeLevel = cu_merge_level | | |
|     } else { | | ⎭ |
|       pu_merge_flag | u(1) \| ae(v) | |
|       PUMergeFlag = pu_merge_flag | | |
|       if (PUMergeFlag) { | | |
|         pu_merge_left_flag | u(1) \| ae(v) | |
|         PUMergeLeftFlag = pu_merge_left_flag | | ⎬ st704 |
|         PUMergeLevel = 0 | | |
|         if (PredMode == MODE_INTER) { | | |
|           pu_merge_level | ue(v) \| ae(v) | |
|           PUMergeLevel = pu_merge_level | | |
|         } | | |
|       } | | |
|     } | | |
|   if( PredMode == MODE_INTRA ) { | | ⎫ |
|     if (PUMergeFlag == 0) | | ⎬ st705 |
|       intra_mode () | | ⎭ |
|   } else { // PredMode == MODE_INTER | | |
|     if (PUMergeFlag == 0 \|\| PUMergeLevel < 2) { | | |
|       if (PUMergeLevel < 1) { | | |
|         inter_pred_idc | ue(v) \| ae(v) | ⎬ st706 |
|         mv_predictor () | | |
|         weighted_pred_param () | | |
|       } | | |
|       mv_difference () | | ⎫ st707 |
|       ref_picture () | | ⎭ |
|     } | | |
|     } | | |
|   } | | |
| } | | |

| pred_mode | INTRA | | INTER | | |
|---|---|---|---|---|---|
| pu_merge_flag | 0 | 1 | 0 | 1 | 1 |
| pu_merge_level | – | – | – | 0 | 1 |
| merge_left_flag | – | o | – | o | o |
| prev_intra_luma_pred_flag | o | inf. | – | – | – |
| rem_intra_luma_pred_mode | o | inf. | – | – | – |
| inter_pred_idc | – | – | o | o | inf. |
| mvp_idx_lX | – | – | o | o | inf. |
| mvd_lX | – | – | o | def. | def. |
| ref_idx_lX | – | – | o | inf. | inf. |
| weighted_pred_param | – | – | o | inf. | inf. |

(b)

| PU_merge_flag | PU_merge_level | OBJECTS TO MERGE |
|---|---|---|
| 1 | 1 | MOTION INFORMATION, TRANSFORM TYPE, TRANSFORM COEFFICIENTS |
| 1 | 0 | MOTION INFORMATION |
| 0 | – | NONE |

(c)

| PU_merge_flag | PU_merge_level | OBJECTS TO MERGE |
|---|---|---|
| 1 | 2 | MOTION INFORMATION, TRANSFORM COEFFICIENTS |
| 1 | 1 | MOTION INFORMATION |
| 1 | 0 | TRANSFORM COEFFICIENTS |
| 0 | – | NONE |

FIG. 9

| transform_tree ( x0, y0, log2TrafoSize, trafoDepth, blkIdx ) { | Descriptor | |
|---|---|---|
| if (cu_merge_flag) { | | ⎫ |
|    TuMergeFlag = cu_merge_flag | | |
|    TuMergeLeftFlag = cu_merge_left_flag | | |
|    if (PredMode == MODE_INTER) | | ⎬ st901 |
|       TuMergeLevel = cu_merge_level | | |
| } else { | | ⎭ |
|    tu_merge_flag | u(1) | ⎫ |
|    TuMergeFlag = tu_merge_flag | | |
|    if (TuMergeFlag) { | | |
|       tu_merge_left_flag | u(1) | ⎬ st902 |
|       TuMergeLeftFlag = tu_merge_left_flag | | |
|       tu_merge_level | u(1) | |
|       TuMergeLevel = tu_merge_level | | ⎭ |
|    } | | |
| } | | |
| if (!TuMergeFlag || TuMergeLevel==0) | | ⎫ st903 |
|    transform_type | u(1) | ⎭ |
| if(EntropyCodingMode == CABAC) | | ⎫ st904 |
|    transform_tree_cabac( x0, y0, log2TrafoSize, trafoDepth, blkIdx ) | | ⎭ |
| else | | ⎫ st905 |
|    transform_tree_lcec( x0, y0, log2TrafoSize, trafoDepth, blkIdx ) | | ⎭ |
| } | | |

| transform_tree_cabac( x0, y0, log2TrafoSize, trafoDepth, blkIdx ) { | Descriptor | |
|---|---|---|
| if (trafoDepth == 0){ | | ⎫ |
| if( PredMode != MODE_INTRA ) | | ⎬ st1001 |
| no_residual_data_flag | ae(v) | |
| residualDataPresentFlag = !no_residual_data_flag | | ⎭ |
| } | | |
| else { | | |
| residualDataPresentFlag = TRUE | | |
| } | | |
| if ( residualDataPresentFlag) { | | |
| if(trafoDepth < maxDepth && (TuMergeFlag == 0 \|\| TuMergeLevel < 2)) | | |
| split_transform_flag[ x0 ][ y0 ][ trafoDepth ] | ae(v) | ⎬ st1002 |
| if( split_transform_flag[ x0 ][ y0 ][ trafoDepth ] ) { | | |
| x1 = x0 + ( ( 1 << log2TrafoSize ) >> 1 ) | | |
| y1 = y0 + ( ( 1 << log2TrafoSize ) >> 1 ) | | |
| transform_tree_cabac( x0, y0, log2TrafoSize − 1, trafoDepth + 1, 0 ) | | |
| transform_tree_cabac ( x1, y0, log2TrafoSize − 1, trafoDepth + 1, 1 ) | | |
| transform_tree_cabac ( x0, y1, log2TrafoSize − 1, trafoDepth + 1, 2 ) | | |
| transform_tree_cabac ( x1, y1, log2TrafoSize − 1, trafoDepth + 1, 3 ) | | |
| } | | |
| else { | | ⎫ |
| coded_block_flag_luma[ x0 ][ y0 ][ trafoDepth ] | ae(v) | |
| coded_block_flag_cb[ x0 ][ y0 ][ trafoDepth ] | ae(v) | |
| coded_block_flag_cr[ x0 ][ y0 ][ trafoDepth ] | ae(v) | ⎬ st1003 |
| CodedTransCoeffPattern = derive_coded_trans_coeff_pattern (x0, y0, TuMergeFlag, TuMergeLevel) | | |
| transform_coeff (x0, y0, log2TrafoSize, trafoDepth, CodedTransCoeffPattern) | | ⎭ |
| } | | |
| } | | |
| } | | |

(b)

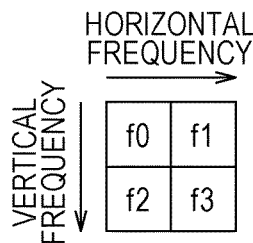

FIG. 11

| transform_tree_lcec( x0, y0, log2TrafoSize, trafoDepth, blkIdx ) { | Descriptor | |
|---|---|---|
|   if (trafoDepth == 0){ | | ⎫ |
|     cbp_yuv_root | vlc(n,v) | ⎬ st1101 |
|     residualDataPresentFlag = (cbp_yuv_root != 0) | | ⎭ |
|   } | | |
|   else { | | |
|     if( blkIdx == 0 ) { | | ⎫ |
|       if (!TuMergeFlag) { | | |
|         cbp_luma[ trafoDepth ] | vlc(n,v) | |
|         cbp_cb[ trafoDepth ] | vlc(n,v) | ⎬ st1102 |
|         cbp_cr[ trafoDepth ] | vlc(n,v) | |
|       else if (TuMergeLevel < 2) { | | |
|         cbp_luma[ trafoDepth ] | vlc(n,v) | ⎭ |
|       } | | |
|     } | | |
|     residualDataPresentFlag = (cbp_yuv_root != 0) | | |
|   } | | |
|   if ( residualDataPresentFlag) { | | |
|     if (trafoDepth < maxDepth) | | |
|       split_transform_flag[ x0 ][ y0 ][ trafoDepth ] | u(1) \| ae(v) | |
|     if( split_transform_flag[ x0 ][ y0 ][ trafoDepth ] ) { | | |
|       x1 = x0 + ( ( 1 << log2TrafoSize ) >> 1 ) | | |
|       y1 = y0 + ( ( 1 << log2TrafoSize ) >> 1 ) | | |
|       if (!TuMergeFlag) { | | |
|         cbp_luma[ trafoDepth+1 ] | vlc(n,v) | |
|         cbp_cb[ trafoDepth+1 ] | vlc(n,v) | |
|         cbp_cr[ trafoDepth+1 ] | vlc(n,v) | |
|       } | | |
|       else if (TuMergeLevel < 2) { | | |
|         cbp_luma[ trafoDepth ] | vlc(n,v) | |
|       } | | |
|       transform_tree_lcec( x0, y0, log2TrafoSize − 1, trafoDepth + 1, 0 ) | | |
|       transform_tree_lcec ( x1, y0, log2TrafoSize − 1, trafoDepth + 1, 1 ) | | |
|       transform_tree_lcec ( x0, y1, log2TrafoSize − 1, trafoDepth + 1, 2 ) | | |
|       transform_tree_lcec ( x1, y1, log2TrafoSize − 1, trafoDepth + 1, 3 ) | | |
|     } | | |
|     else { | | |
|       CodedTransCoeffPattern<br>        = derive_coded_trans_coeff_pattern (x0, y0, TuMergeFlag, TuMergeLevel) | | ⎫<br>⎬ st1103 |
|       transform_coeff (x0, y0, log2TrafoSize, trafoDepth, CodedTransCoeffPattern) | | ⎭ |
|     } | | |
|   } | | |
| } | | |

| tu_merge_flag | 0 | 1 | 1 | 1 |
|---|---|---|---|---|
| tu_merge_level | – | 0 | 1 | 2 |
| split_transform_flag | o | o | o | inf. |
| tu_merge_left_flag | – | o | o | o |
| transform_type | o | inf. | inf. | inf. |
| cbp_luma, coded_block_flag_luma | o | o | o | inf. |
| cbp_cb/cr, coded_block_flag_cb/cr | o | inf. | inf. | inf. |
| coded_trans_coeff_pattern | – | – | inf. | – |
| transform_coeff | o (all) | o (all) | o (part) | def. |

(b)

| TU_skip_flag | TU_skip_level | OBJECTS TO SKIP |
|---|---|---|
| 1 | 2 | TRANSFORM COEFFICIENTS (ALL COEFFICIENTS) |
| 1 | 1 | TRANSFORM COEFFICIENTS (NON-DC COMPONENTS) |
| 1 | 0 | TRANSFORM COEFFICIENTS (HIGH-FREQUENCY COMPONENTS) |
| 0 | – | NONE |

FIG. 13

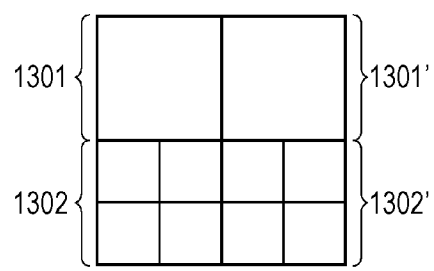

IMAGE DECODING DEVICE, IMAGE ENCODING DEVICE, AND DATA STRUCTURE OF ENCODED DATA

TECHNICAL FIELD

The present invention relates to an image decoding device that decodes encoded data, and to an image encoding device that generates encoded data. The present invention also relates to a data structure of encoded data that is generated by an image encoding device and referenced by an image decoding device.

BACKGROUND ART

In order to efficiently transmit or record video images, there are used a video image encoding device (image encoding device) that generates encoded data by encoding video images, and a video image decoding device (image decoding device) that generates decoded images by decoding such encoded data. Specific video image coding schemes include, for example, the scheme implemented in the KTA software, which is a jointly developed codec by H.264/MPEG-4 AVC (NPL 1) and the Video Coding Experts Group (VCEG), the scheme implemented in the Test Model under Consideration (TMuC) software, as well as the scheme implemented in the successor codec, the Working Draft 1 of High-Efficiency Video Coding (NPL 2, hereinafter also called HEVC WD1).

In such coding schemes, an image (picture) constituting a video image is managed with a hierarchical structure made up of slices obtained by splitting an image, coding units obtained by splitting slices (also called macroblocks or CUs (coding units) in some cases), as well as blocks and partitions obtained by splitting coding units. Ordinarily, an image is encoded on a per-block basis.

Also, in such coding schemes, ordinarily a predicted image is generated on the basis of a locally decoded image obtained by encoding/decoding an input image, and the prediction residual (also called the "differential image" or "residual image") obtained by subtracting the predicted image from the input image (original image) is encoded. Also, inter-frame prediction (inter prediction) and intra-frame prediction (intra prediction) may be cited as methods of generating predicted images.

With inter prediction, predicted images in a frame being decoded are generated in units of prediction units, by applying motion compensation using motion vectors, and by taking already-decoded frames as reference frames.

On the other hand, with intra prediction, predicted images in a frame being decoded are generated in units of prediction units, on the basis of already-decoded areas of the frame being decoded. One example of the intra prediction used in H.264/MPEG-4 AVC is a method that, for each prediction unit (each partition, for example), generates pixel values in that prediction unit by (1) selecting a prediction mode from a predetermined prediction mode group, and (2) extrapolating pixel values in an already-decoded area, in an extrapolation direction (prediction direct) that corresponds to the selected prediction mode (this method is also called "base prediction").

Also, NPL 2 describes technology that reduces the bit rate of encoded data by skipping (Skip) or inferring (Merge) part of the information used for decoding. More specifically, from among the various information constituting encoded data used in the case of decoding a CU, information indicating a transform tree (TT) included in the CU and information indicating the splitting method for prediction units (PUs) in inter prediction are subjected to Skip. The transform tree (TT) includes information related to transform units (TUs) applied to each partial area within a CU. Meanwhile, information indicating the splitting method for prediction units (PUs) in inter prediction are subjected to Merge.

Additionally, from among the various information constituting encoded data used in the case of decoding the above prediction units (PUs), information indicating the types of inter prediction, information indicating reference images used in the case of inter prediction, and information indicating motion vectors are subjected to Skip or Merge.

In addition, NPL 3 discloses technology that changes the object of Merge from various information included in encoded data used in the case of decoding a CU to various information included in encoded data used in the case of decoding a PU.

CITATION LIST

Non Patent Literature

NPL 1: "Recommendation ITU-T H.264", Telecommunication Standardization Sector of ITU, March 2009
NPL 2: "JCTVC-C403", Joint Collaborative Team on Video Coding (JCT-VC) of ITU-T SG16 WP3 and ISO/IEC JTC1/SC29/WG11, 3rd Meeting: Guangzhou, CN, 7-15 Oct. 2010
NPL 3: "JCTVC-D441", Joint Collaborative Team on Video Coding (JCT-VC) of ITU-T SG16 WP3 and ISO/IEC JTC1/SC29/WG11, 4th Meeting: Daegu, KR, 20-28 Jan. 2011

SUMMARY OF INVENTION

Technical Problem

However, with the above configurations of the related art, only part of the various information included in encoded data is subjected to Skip or Merge. Also, the encoded data that includes various information subjected to Skip or Merge is limited to encoded data used in the case of decoding a CU, or encoded data used in the case of decoding a PU.

Consequently, with the above configurations of the related art, the code rate of encoded data is not sufficiently reduced.

The present invention has been devised in light of the above problems, and an object thereof is to realize an image encoding device and the like able to further reduce the code rate of encoded data.

Solution to Problem

In order to solve the above problem, an image decoding device according to the present invention is an image decoding device that decodes an image by decoding encoded data that includes encoded and quantized transform coefficients in which a prediction residual obtained by subtracting a predicted image from an original image is transformed and quantized per a transform unit, and the quantized transform coefficients are encoded. The image decoding device is equipped with decoding means that, for a partial unit obtained by splitting the transform unit, infers, or alternatively, decodes from the encoded data, non-zero transform coefficient presence information indicating whether or not non-zero transform coefficients are included in that partial unit, and in the case where the non-zero transform coefficient presence information indicates that non-zero transform coefficients are present within that partial unit, decodes each transform coefficient within the decoding unit that includes that partial unit from the encoded data.

According to the above configuration, for a partial unit obtained by splitting a transform unit, non-zero transform coefficient presence information is inferred or decoded, and in the case where the non-zero transform coefficient presence information indicates that non-zero transform coefficients are present, transform coefficients within a decoding unit that includes that partial unit are decoded. Thus, the determination of whether or not non-zero transform coefficients are present may be conducted for a partial unit.

In order to solve the above problem, an image decoding device according to the present invention is an image decoding device that decodes an image by decoding encoded data that includes encoded and quantized transform coefficients in which a prediction residual obtained by subtracting a predicted image from an original image is transformed and quantized per a transform unit, and the quantized transform coefficients are encoded. The image decoding device is equipped with decoding means that, in the case where the encoded data includes merge/skip information that merges or skips presence information indicating whether or not frequency-domain transform coefficients are included in the quantized transform coefficients, does not decode the presence information, and inferring means that, in the case where the encoded data includes merge/skip information that merges or skips the presence information, infers the presence information. The decoding means uses the presence information inferred by the inferring means to decode the encoded and quantized transform coefficients.

Herein, merging refers to omitting particular information necessary for decoding, with the information being estimated on the basis of information at a default or a specified position. Meanwhile, skipping refers to omitting particular information necessary for decoding, and using estimated values or default values instead.

According to the above configuration, decoding may be conducted by transmitting only merge/skip information, without transmitting information indicating whether or not frequency-domain transform coefficients are present.

Accordingly, since there is no need to transmit information indicating whether or not frequency-domain transform coefficients are present, which needed to be transmitted hitherto, further reducing the bit rate of encoded data compared to the past becomes possible.

In order to solve the above problem, an image decoding device according to the present invention is an image decoding device that decodes an image by decoding encoded data that includes encoded and quantized transform coefficients in which a prediction residual obtained by subtracting a predicted image from an original image is transformed and quantized per a transform unit, and the quantized transform coefficients are encoded. The encoded data includes encoded transform information in which transform information used in the transform is encoded per the transform unit. The image decoding device is equipped with inferring means that, in the case where the encoded data includes merge/skip information that merges or skips the transform information and the quantized transform coefficients per the transform unit, infers the transform information and the quantized transform coefficients in that transform unit according to a method indicated by the merge/skip information.

According to the above configuration, merging or skipping may be conducted on a transform unit, and thus the bit rate of encoded data may be further reduced.

In order to solve the above problem, an image encoding device according to the present invention is an image encoding device that outputs encoded data that includes encoded and quantized transform coefficients in which a prediction residual obtained by subtracting a predicted image from an original image is transformed and quantized per a transform unit, and the quantized transform coefficients are encoded. The image encoding device is equipped with encoding means that includes, in the encoded data, merge/skip information that merges or skips presence information indicating whether or not frequency-domain transform coefficients are included in the quantized transform coefficients.

According to the above configuration, there is output encoded data that includes only merge/skip information, without including information indicating whether or not frequency-domain transform coefficients are present.

Accordingly, since there is no need to include, in the encoded data, information indicating whether or not frequency-domain transform coefficients are present, which needed to be output hitherto, further reducing the bit rate of encoded data compared to the past becomes possible.

In order to solve the above problem, a data structure of encoded data according to the present invention is a data structure of encoded data that includes encoded and quantized transform coefficients in which a prediction residual obtained by subtracting a predicted image from an original image is transformed and quantized per a transform unit, and the quantized transform coefficients are encoded. The data structure includes merge/skip information that merges or skips presence information indicating whether or not frequency-domain transform coefficients are included in the quantized transform coefficients.

According to the above configuration, encoded data includes only merge/skip information, without including information indicating whether or not frequency-domain transform coefficients are present.

Accordingly, since there is no need to include, in the encoded data, information indicating whether or not frequency-domain transform coefficients are present, which was necessary hitherto, further reducing the bit rate of encoded data compared to the past becomes possible.

Advantageous Effects of Invention

As above, an image decoding device according to the present invention is equipped with decoding means that, in the case where encoded data includes merge/skip information that merges or skips presence information indicating whether or not frequency-domain transform coefficients are included in the quantized transform coefficients, does not decode the presence information, and inferring means that, in the case where the encoded data includes merge/skip information that merges or skips the presence information, infers the presence information. The decoding means is configured to use the presence information inferred by the inferring means to decode the encoded and quantized transform coefficients.

Accordingly, since there is no need to transmit information indicating whether or not frequency-domain transform coefficients are present, which needed to be transmitted hitherto, the advantage of being able to further reduce the bit rate of encoded data compared to the past is exhibited.

BRIEF DESCRIPTION OF DRAWINGS

FIG. 5 is a syntax table illustrating the content of a process by a CU information decoder in the above video image decoding device.

FIG. 6 illustrates processing details of the above CU information decoder, in which (a) and (b) are diagrams illustrating relationships between a merge flag as well as a merge level, and objects to merge.

FIG. 7 is a syntax table illustrating the content of a process by a PT information decoder in the above video image decoding device.

FIG. 8 illustrates processing details of the above PT information decoder, in which (a), (b), and (c) are diagrams illustrating relationships between a merge flag as well as a merge level, and objects to merge.

FIG. 9 is a syntax table illustrating the content of a process by a TT information decoder in the above video image decoding device.

FIG. 10 illustrates the content of a process by the above TT information decoder, in which (a) is a syntax table illustrating processing details, and (b) is a diagram for explaining the content of the syntax table.

FIG. 11 is a syntax table illustrating the content of a process by the above TT information decoder.

FIG. 12 illustrates processing details of the above TT information decoder, in which (a) and (b) are diagrams illustrating relationships between a merge flag as well as a merge level, and objects to merge.

FIG. 13 is a diagram for explaining an example of merging.

DESCRIPTION OF EMBODIMENTS

An embodiment of an image decoding device and an image encoding device according to the present invention may be described as follows on the basis of the drawings. Note that an image decoding device according to the present embodiment is a device that decodes video images from encoded data. Consequently, such a device is hereinafter designated a "video image decoding device". Also, an image encoding device according to the present embodiment is a device that generates encoded data by encoding video images. Consequently, such a device is hereinafter called a "video image encoding device".

Note that although respective information is primarily described for the case of being merged, the description is similar for skipping. Merging refers to omitting particular information necessary for decoding, with the information being inferred on the basis of information at a default or a specified position. Meanwhile, skipping refers to omitting particular information necessary for decoding, and using inferred values or default values instead.

(Structure of Encoded Data #1)

Before describing a video image decoding device (image decoding device) according to the present embodiment, the structure of encoded data #1, which is generated by a video image encoding device 2 and decoded by a video image decoding device 1 according to the present embodiment, will be described using FIGS. 2 to 4. The encoded data #1 includes a sequence, as well as multiple pictures constituting the sequence.

Figure 2:
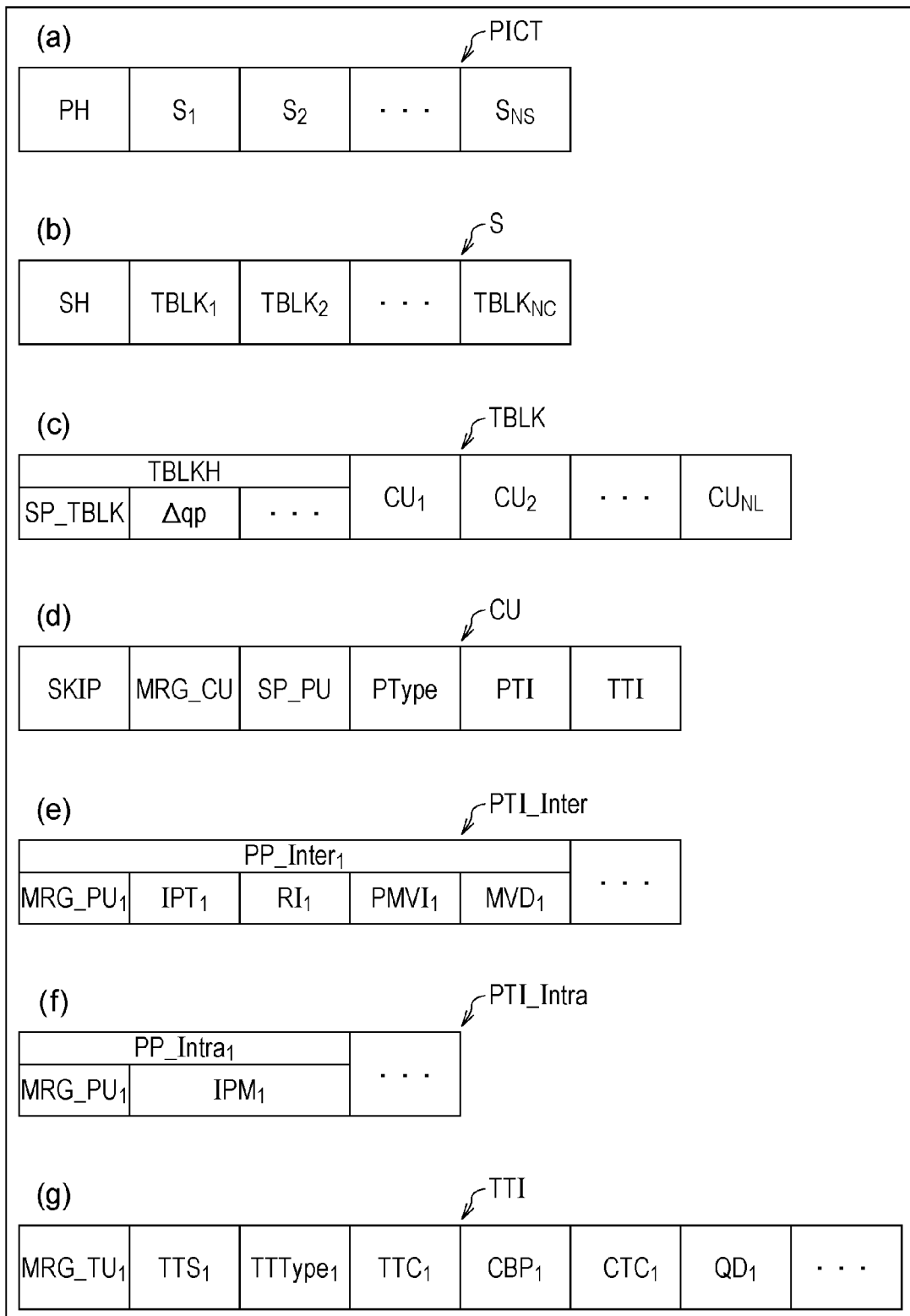
FIG. 2 illustrates data structures of encoded data that is generated by a video image encoding device and referenced by the above video image decoding device, in which (a) is a diagram illustrating the structure of a picture layer in encoded data, (b) is a diagram illustrating the structure of a slice layer included in a picture layer, (c) is a diagram illustrating the structure of a TBLK layer included in a slice layer, (d) is a diagram illustrating the structure of a CU included in a TBLK layer, (e) is a diagram illustrating the structure of inter prediction information for a CU, (f) is a diagram illustrating the structure of intra prediction information for a CU, and (g) is a diagram illustrating the structure of transform tree for a CU.

FIG. 2 illustrates the hierarchical structure of the picture layer and below in the encoded data #1. FIG. 2(a) is a diagram illustrating the structure of a picture layer defining a picture PICT. FIG. 2(b) is a diagram illustrating the structure of a slice layer defining a slice S. FIG. 2(c) is a diagram illustrating the structure of a tree block layer defining a tree block TBLK. FIG. 2(d) is a diagram illustrating the structure of a CU layer defining a coding unit (CU) included in the tree block TBLK.

Also, FIG. 2(e) is a diagram illustrating the structure of inter prediction information PTI_Inter, which is information regarding a prediction tree (PT), being prediction information PTI regarding an inter prediction (inter-frame prediction) partition. FIG. 2(f) is a diagram illustrating the structure of intra prediction information PTI_Intra, which is information regarding a prediction tree (PT), being prediction information PTI regarding an intra prediction (intra-frame prediction) partition. FIG. 2(g) is a diagram illustrating the structure of transform unit information TTI, which is information regarding a transform tree (TT) included in a coding unit CU.

Figure 3:
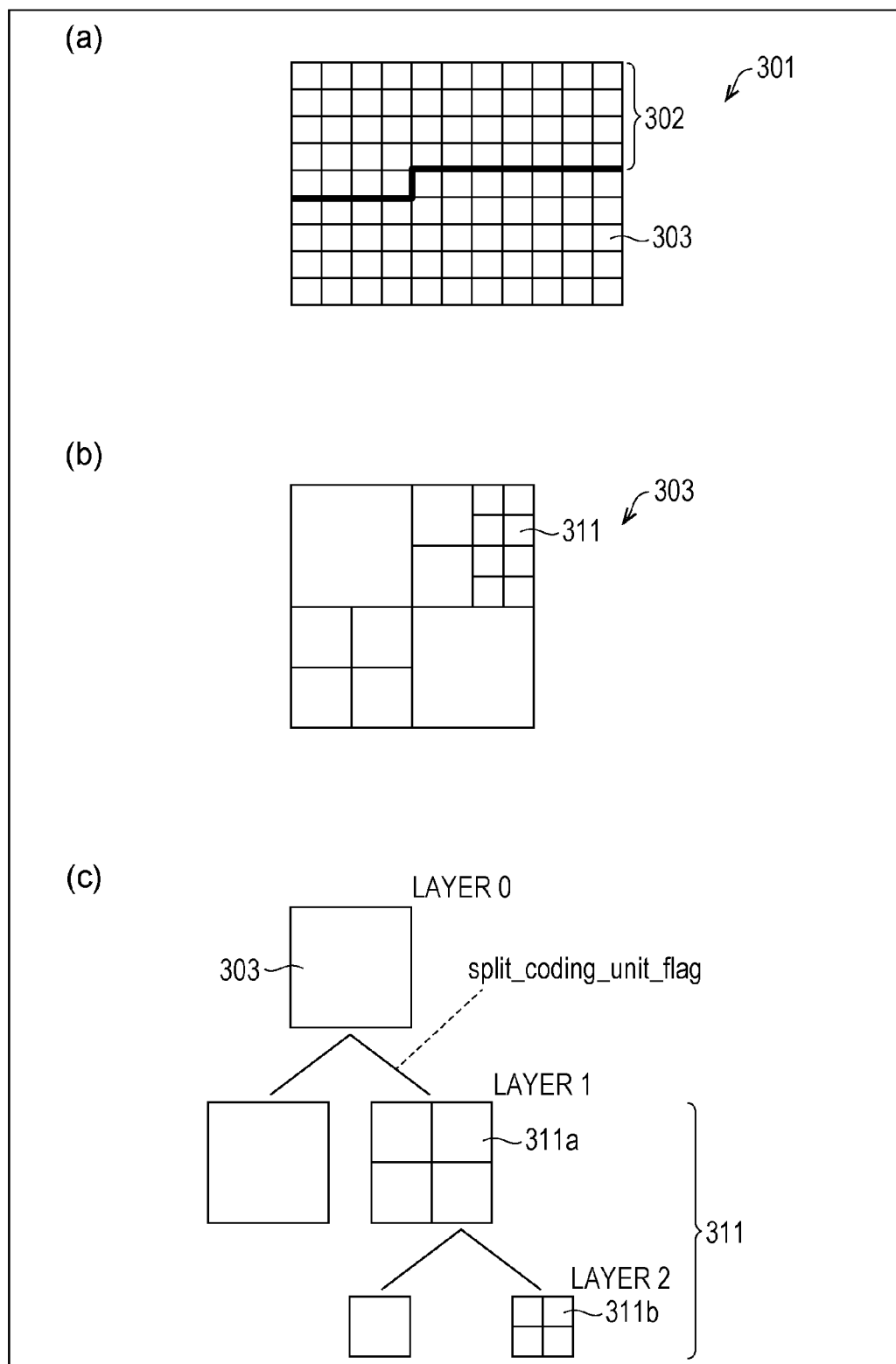
FIG. 3 is a diagram illustrating the structure of an image generated by a video image encoding device and referenced by the above video image decoding device, in which (a) is a diagram illustrating a state of splitting a picture into slices and TBLKs, while (b) and (c) are diagrams illustrating a state of splitting a TBLK into CUs.
Figure 4:
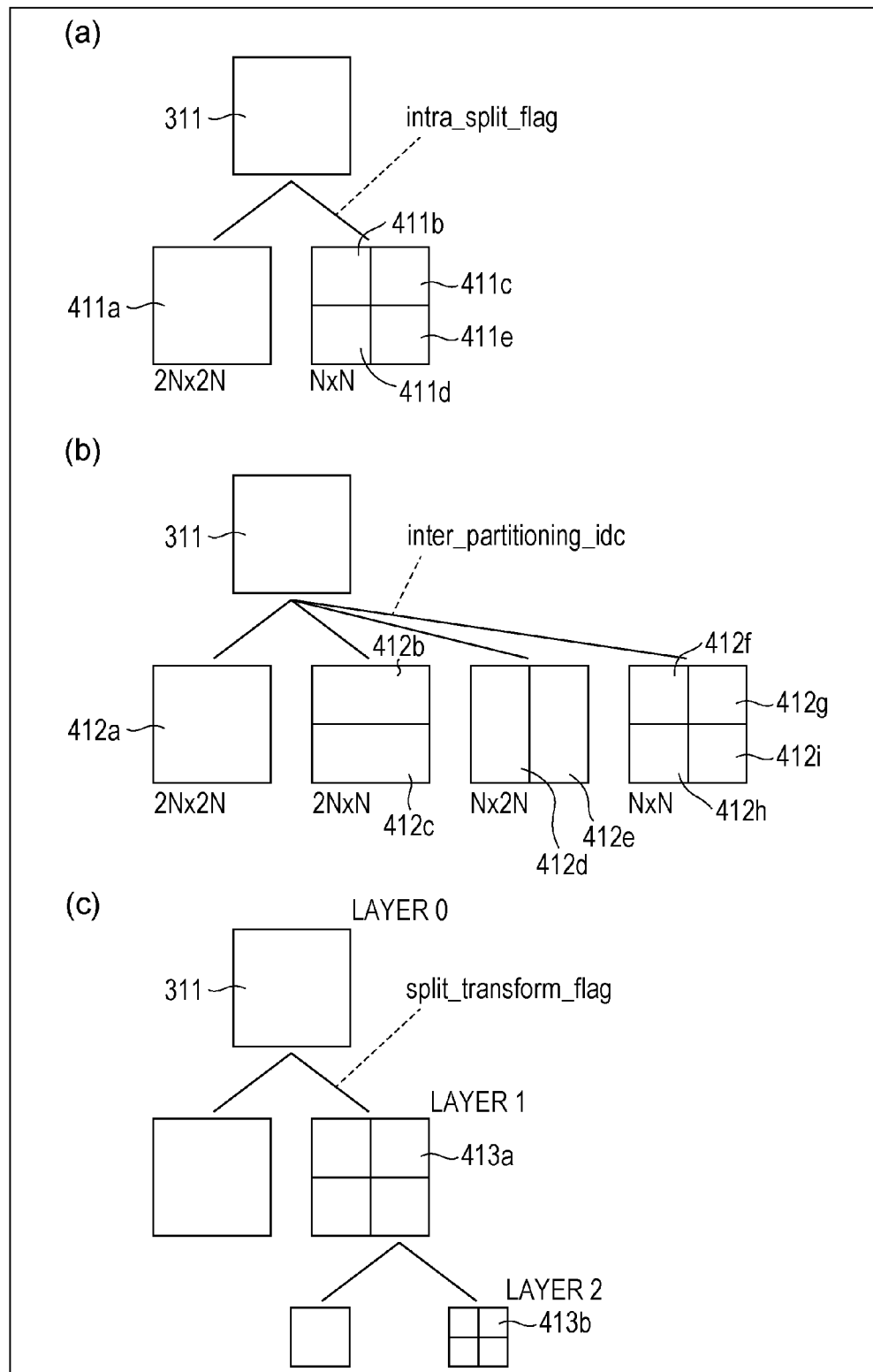
FIG. 4 is a diagram illustrating the structure of an image generated by a video image encoding device and referenced by the above video image decoding device, in which (a) is a diagram illustrating a state of splitting a CU into intra prediction units, (b) is a diagram illustrating a state of splitting a CU into inter prediction units, and (c) is a diagram illustrating a state of splitting a CU into transform units.

In addition, FIGS. 3 and 4 are diagrams illustrating the state of splitting a picture PICT into slices S, tree blocks TBLK, prediction units PU, and transform units TU.

(Picture Layer)

In the picture layer, there is defined a set of data that the video image decoding device 1 references in order to decode a picture PICT being processed (hereinafter also referred to as the target picture). As illustrated in FIG. 2(a), a picture PICT includes a picture header PH, as well as slices $S_1$ to $S_{NS}$ (where NS is the total number of slices included in the picture PICT).

Note that the subscripts of the sign may be omitted in cases where distinguishing each of the slices $S_1$ to $S_{NS}$ is unnecessary. The above similarly applies to other data given subscripts from among the data included in the encoded data #1 described hereinafter.

The picture header PH includes a coding parameter group that the video image decoding device 1 references in order to determine a decoding method for the target picture. For example, coding mode information (entropy_coding_mode_flag), which indicates the variable-length coding used in the case of encoding by the video image encoding device 2, is one example of a coding parameter included in the picture header PH.

In the case where the entropy_coding_mode_flag is 0, the target picture PICT is encoded by low-complexity entropy coding (LCEC) or context-based adaptive variable-length coding (CAVLC). Meanwhile, in the case where the entropy_coding_mode_flag is 1, the target picture PICT is encoded by context-based adaptive binary arithmetic coding (CABAL).

Note that the picture header PH may also be referred to as the picture parameter set (PPS).

(Slice Layer)

In the slice layer, there is defined a set of data that the video image decoding device 1 references in order to decode a slice S being processed (hereinafter also referred to as the target slice). As illustrated in FIG. 2(b), a slice S includes a slice header SH, as well as tree blocks $TBLK_1$ to $TBLK_{NC}$ (where NC is the total number of tree blocks included in the slice S).

The slice header SH includes a coding parameter group that the video image decoding device 1 references in order to determine a decoding method for the target slice. Slice type designation information (slice_type) that designates a slice type is one example of a coding parameter included in the slice header SH.

Potential slice types that may be designated by the slice type designation information include (1) I slices that use only intra prediction in the case of encoding, (2) P slices that use unidirectional prediction or intra prediction in the case of encoding, and (3) B slices that use unidirectional prediction, bidirectional prediction, or intra prediction in the case of encoding.

In addition, the slice header SH may also include filter parameters referenced by a loop filter (not illustrated) provided in the video image decoding device 1.

Also, as illustrated in FIG. 3(a), a slice S is formed by splitting a picture PICT. In FIG. 3(a), a picture PICT 301 is split to form a slice S 302.

(Tree Block Layer)

In the tree block layer, there is defined a set of data that the video image decoding device 1 references in order to decode a tree block TBLK being processed (hereinafter also referred to as the target tree block).

A tree block TBLK includes a tree block header TBLKH and coding unit information $CU_1$ to $CU_{NL}$ (where NL is the total number of coding units included in the tree block TBLK). At this point, the relationship between a tree block TBLK and coding unit information CU first will be described as follows.

A tree block TBLK is split into units for designating block sizes for the respective processes of intra prediction or inter prediction, as well as transformation.

The above units of a tree block TBLK are recursively split by quadtree subdivision. A tree structure obtained by such recursive quadtree subdivision is hereinafter designated a coding tree.

Hereinafter, units that correspond to the leaves, that is, the end nodes of a coding tree, will be referred to as coding nodes. Also, since coding nodes become the basic units of the encoding process, hereinafter, coding nodes will also be referred to as coding units (CUs).

In other words, the coding unit information (hereinafter designated CU information) $CU_1$ to $CU_{NL}$ is information corresponding to respective coding nodes (coding units) obtained by recursive quadtree subdivision of a tree block TBLK.

Also, the root of a coding tree is associated with a tree block TBLK. In other words, a tree block TBLK is associated with the uppermost node of the tree structure of a quadtree subdivision that recursively contains multiple coding nodes.

Note that the size of a particular coding node is half, both vertically and horizontally, of the size of the coding node to which the particular coding node directly belongs (that is, the unit of the node that is one layer above the particular coding node).

Also, the size that a particular coding node may take depends on coding node size designation information as well as the maximum hierarchical depth included in the sequence parameter set (SPS) of the encoded data #1. For example, in the case where the size of a tree block TBLK is 64×64 pixels and the maximum hierarchical depth is 3, coding nodes in the layers at and below that tree block TBLK may take one of four types of size, namely, 64×64 pixels, 32×32 pixels, 16×16 pixels, and 8×8 pixels.

In addition, for the block structure, a slice S is split to form tree blocks TBLK 303, as illustrated in FIG. 3(a). Furthermore, the tree blocks TBLK 303 are split to form CUs 311, as illustrated in FIG. 3(b).

Also, FIG. 3(c) illustrates how a tree block TBLK 303 is split by quadtree subdivision in the case where the maximum hierarchical depth is "2". As illustrated in FIG. 3(c), CUs 311b become coding nodes in the case where the maximum hierarchical depth is "2", and the value of a later-discussed CU split flag (split_coding_unit_flag) is "1" in a layer 0 and also "1" in a layer 1. On the other hand, CUs 311a become coding nodes in the case where the maximum hierarchical depth is "1", and the value of the CU split flag is "1" in layer 0.

(Tree Block Header)

The tree block header TBLKH includes coding parameters that the video image decoding device 1 references in order to determine a decoding method for the target tree block. Specifically, there is included tree block split information SP_TBLK that designates a split pattern for each CU in the target tree block, as well as a quantization parameter differential Δqp (qp_delta) that designates the size of the quantization step, as illustrated in FIG. 2(c).

The tree block split information SP_TBLK is information expressing a coding tree for splitting a tree block, and more specifically, information that designates the shape and size of each CU included in the target tree block, as well as the position within the target tree block.

Note that the tree block split information SP_TBLK may also not explicitly include CU shapes and sizes. For example, the tree block split information SP_TBLK may also be a set of flags (split_coding_unit_flag) indicating whether or not to split the entire tree block or a partial area of the tree block into four subdivisions. In this case, the shape and size of each CU may be specified by combined use of the tree block shape and size.

Also, the quantization parameter differential Δqp is the difference qp−qp' between a quantization parameter qp for the target tree block, and a quantization parameter qp' for a tree block encoded immediately before that target tree block.

(CU Layer)

In the CU layer, there is defined a set of data that the video image decoding device 1 references in order to decode a CU being processed (hereinafter also referred to as the target CU).

At this point, before describing the specific content of data included in the CU information CU, the tree structure of data included in a CU will be described. A coding node becomes the root of a prediction tree PT and a transform tree TT. The prediction tree and transform tree are described as follows.

In the prediction tree, a coding node is split into one or multiple prediction blocks, and the position and size of each prediction block are defined. Stated differently, prediction blocks are one or more non-overlapping areas that constitute a coding node. In addition, the prediction tree includes the one or more prediction blocks obtained by the above splitting.

A prediction process is conducted on each prediction block. Hereinafter, these prediction blocks which are the units of prediction will also be referred to as prediction units (PUs).

Meanwhile, in the transform tree, a coding node is split into one or multiple transform blocks, and the position and size of each transform block are defined. Stated differently, transform blocks are one or more non-overlapping areas that constitute a coding node. In addition, the transform tree includes the one or more transform blocks obtained by the above splitting.

A transform process is conducted on each transform block. Hereinafter, these transform blocks which are the units of transformation will also be referred to as transform units (TUs).

(Data Structure of CU Information CU)

Next, the specific content of data included in the CU information CU will be described with reference to FIG. 2(d). As illustrated in FIG. 2(d), the CU information CU includes a skip flag SKIP, a merge flag MRG_CU, PU split information SP_PU that designates a split pattern for each prediction unit in the target CU, prediction type information PType, PT information PTI, and TT information TTI.

The skip flag SKIP is a flag indicating whether or not a skip mode is applied to the target CU. In the case where the skip flag SKIP has a value of 1, that is, in the case where skip mode is applied to the target CU, various information subjected to skipping is omitted, and default values or inferred values are used in the case of decoding. Note that the various information that may be skipped will be discussed later. Also, the skip flag SKIP is omitted in I slices.

The merge flag MRG_CU is a flag indicating whether or not a merge mode is applied to the target CU. In the case where the merge flag MRG_CU has a value of 1, that is, in the case where merge mode is applied to the target CU, various information subjected to merging is omitted, and inferred values are used in the case of decoding. Note that the various information that may be merged will be discussed later.

The PU split information SP_PU is information for determining shape and size of each PU included in the target CU, as well as the position within the target CU. For example, the PU split information SP_PU may be realized from at least one of an intra split flag (intra_split_flag) that designates intra splitting from the target CU, and an inter split flag (inter_partitioning_idc) that designates inter partitioning from the target CU.

The intra split flag is information that designates the shape and size of each intra PU (each PU used for intra prediction) included in the target CU, as well as the position within the target CU.

The inter split flag is information that designates the shape and size of each inter PU (each PU used for inter prediction) included in the target CU, as well as the position within the target CU.

The prediction type information PType is information that designates whether to use intra prediction or inter prediction as the predictive image generation method for a target PU.

The PT information PTI is information related to a PT included in the target CU. In other words, the PT information PTI is a set of information related to each of one or more PUs included in the PT, and is referenced in the case where the video image decoding device 1 generates a predicted image. As illustrated in FIG. 2(e) and FIG. 2(f), the PT information PTI includes inter prediction information (PTI_Inter) or intra prediction information (PTI_Intra), depending on which prediction method is designated by the prediction type information PType. Hereinafter, a PU to which intra prediction is applied will be designated an intra PU, while a PU to which inter prediction is applied will be designated an inter PU.

The TT information TTI is information related to a TT included in the target CU. In other words, the TT information TTI is a set of information related to each of one or more TUs included in the TT, and is referenced in the case where the video image decoding device 1 decodes residual data.

(Inter Prediction Information PTI_Inter)

The inter prediction information PTI_Inter includes coding parameters that are referenced in the case where the video image decoding device 1 generates an inter-predicted image by inter prediction. As illustrated in FIG. 2(e), for each PU the inter prediction information PTI_Inter respectively includes inter prediction parameters $PP\_Inter_1$ to $PP\_Inter_{Ne}$ (where Ne is the total number of inter prediction PUs included in the target CU).

Inter PUs are created by splitting a target CU into the four symmetric splittings of 2N×2N pixels (the same size as the target CU), 2N×N pixels, N×2N pixels, and N×N pixels.

A specific description will now be given using FIG. 4(b). As illustrated in FIG. 4(b), for a CU 311, splitting into 2N×2N pixels yields a PU 412a, splitting into 2N×N pixels yields PUs 412b and 412c, splitting into N×2N pixels yields PUs 412d and 412e, and splitting into N×N pixels yields PUs 412f to 412i.

(Inter Prediction Parameters)

As illustrated in FIG. 2(e), the inter prediction parameters PP_Inter include a merge flag MRG_PU, an inter prediction type IPT, a reference image index RI, an inferred motion vector index PMVI, and a motion vector residual MVD.

(Intra Prediction Information PTI_Intra)

The intra prediction information PTI_Intra includes coding parameters that are referenced in the case where the video image decoding device 1 generates an intra-predicted image by intra prediction. As illustrated in FIG. 2(f), for each PU the intra prediction information PTI_Intra respectively includes intra prediction parameters $PP\_Intra_1$ to $PP\_Intra_{Na}$ (where Na is the total number of intra prediction PUs included in the target CU).

If the intra split flag is 1, intra PUs are generated by symmetrically splitting the target CU into four PUs, whereas if the intra split flag is 0, the target CU itself is treated as a PU, without splitting the target CU. Consequently, provided that the size of the target CU is 2N×2N pixels, the intra PUs may take the size of either 2N×2N pixels (no splitting) or N×N pixels (4-way splitting) (herein, $N=2^n$, where n is an arbitrary integer equal to or greater than 1). For example, if the target CU is 128×128 pixels, it is possible to split the target CU into 128×128 pixel or 64×64 pixel intra PUs.

A specific description will now be given using FIG. 4(a). As illustrated in FIG. 4(a), for a CU 311, splitting into 2N×2N pixels yields a PU 411a, and splitting into N×N pixels yields PUs 412b to 412e.

(Intra Prediction Parameters PP_Intra)

As illustrated in FIG. 2(f), the intra prediction parameters PP_Intra include a merge flag MRG_PU and an intra prediction mode IPM.

(TT Information TTI)

As illustrated in FIG. 2(g), the TT information TTI includes, for each TU included in the target CU, a merge flag MRG_TU, a transform size TTS, a transform type TTType, transform coefficients TTC, a presence indicator CBP for transform coefficients in the spatial domain, a presence indicator CTC for transform coefficients in the frequency domain, a quantization prediction residual QD.

The presence indicator CTC for transform unit in the frequency domain refers to a concept that encompasses information indicating whether or not each transform coefficient included in a target frequency domain (a target transform unit) is 0, and information indicating whether or not non-zero transform coefficients are included in each partial unit obtained by splitting the target frequency domain (non-zero transform coefficient presence information).

Note that the information indicating whether or not each transform coefficient included in the target frequency domain is 0 is sometimes called the significant_coeff_flag [xC][yC] (where [xC][yC] indicates the position of each transform coefficient in the target frequency domain). The information indicating whether or not non-zero transform coefficients are included in each partial unit obtained by splitting the target frequency domain is sometimes called the significant_coeff_group_flag[xCG][yCG] (where [xCG][yCG] indicates the position of each partial unit in the target frequency domain).

TUs are formed by hierarchical quadtree subdivision of the target CU, with the sizes determined by information indicating whether or not to split the target CU or a partial area of the target CU (split_transform_flag). The split_transform_flag is basically encoded for each node in the quadtree, but may also be omitted and inferred in some cases, depending on transform size-related constraints (the maximum transform size, the minimum transform size, and the maximum hierarchical depth of the quadtree).

FIG. 4(c) illustrates how TUs are formed by quadtree subdivision of a CU 311. As illustrated in FIG. 4(c), a PU 413b becomes a TU in the case where conducting node splitting is indicated in layer 0 and layer 1. On the other hand, a PU 413a becomes a TU in the case where not conducting node splitting is indicated in layer 1.

For example, in the case where the maximum hierarchical depth is "2" and the target CU size is 64×64, TUs included in the target CU may take sizes of 64×64 pixels, 32×32 pixels, or 16×16 pixels.

The quantization prediction residual QD is encoded data generated due to the video image encoding device 2 performing the following processes 1 to 3 on a target block, that is, the block being processed.

Process 1: apply the discrete cosine transform (DCT) to the prediction residual obtained by subtracting a predicted image from the image to be encoded;

Process 2: quantize the transform coefficients obtained in Process 1;

Process 3: encode the quantized transform coefficients into variable-length codes.

Note that the quantization parameter qp discussed earlier expresses the size of the quantization step QP used in the case of the video image encoding device 2 quantizing transform coefficients ($QP=2^{qp/6}$).

(Video Image Decoding Device 1)

Figure 1:
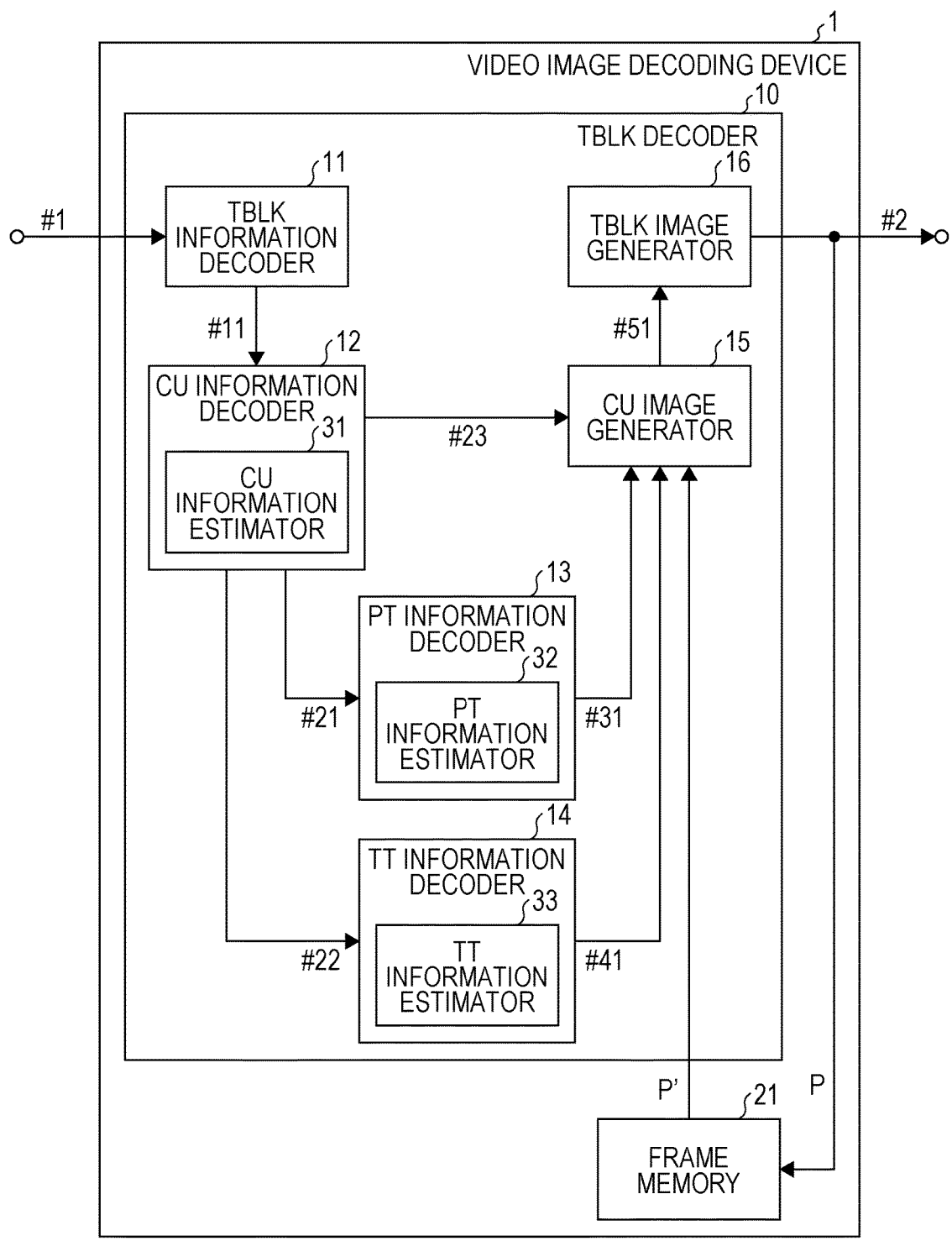
FIG. 1 is a block diagram illustrating a principal configuration of a video image decoding device according to an embodiment of the present invention.

Next, a configuration of the video image decoding device 1 will be described with reference to FIG. 1 and FIGS. 5 to 12. FIG. 1 is a block diagram illustrating a principal configuration of the video image decoding device 1. As illustrated in FIG. 1, the video image decoding device 1 includes a TBLK decoder (decoding means) 10 and frame memory 21. The TBLK decoder 10 includes a TBLK information decoder 11, a CU information decoder 12, a PT information decoder 13, a TT information decoder (decoding means) 14, and a CU image generator 15. Additionally, the CU information decoder 12 includes a CU information inference unit 31, the PT information decoder 13 includes a PT information inference unit 32, and the TT information decoder 14 includes a TT information inference unit (inferring means) 33.

Generally speaking, the video image decoding device 1 is a device that generates and outputs a decoded image #2 by decoding encoded data #1. In addition, the video image decoding device 1 is a video image decoding device, parts of which use technology implemented in the H.264/MPEG-4 AVC standard, technology implemented in the KTA software, which is a jointly developed codec by the Video Coding Experts Group (VCEG), technology implemented in the Test Model under Consideration (TMuC) software, as well as the scheme implemented in the successor codec, the Working Draft 1 of High-Efficiency Video Coding (HEVC WD1).

The video image decoding device 1 generates a predicted image for each prediction unit, and generates and outputs a decoded image #2 by adding together the generated predicted image and the prediction residual decoded from the encoded data #1.

The encoded data #1 input into the video image decoding device 1 is input into the TBLK information decoder 11 of the TBLK decoder 10.

(TBLK Information Decoder 11)

The TBLK information decoder 11 decodes tree block split information SP_TBLK as well as the quantization parameter differential Δqp included in the tree block header TBLKH (TBLKH information) from the input encoded data #1.

The tree block split information includes information that designates the shape and size of each CU included in the target tree block, as well as the position within the target tree block. Split information #11 that includes the decoded TBLKH information and coding unit information CU is then output to the CU information decoder 12.

(CU Information Decoder 12)

The CU information decoder 12 decodes CU information CU from the split information #11 input from the TBLK information decoder 11, and generates CU decoding information #21, CU decoding information #22, and CU decoding information #23. Subsequently, the CU decoding information #21 is input into the PT information decoder 13, the CU decoding information #22 into the TT information decoder 14, and the CU decoding information #23 into the CU image generator 15.

Described more specifically, the CU information decoder 12 decodes the skip flag SKIP (skip_flag) and the merge flag MRG_CU (cu_merge_flag) included in the CU information CU. Subsequently, in the case where the value of the merge flag MRG_CU is "1", the CU information decoder 12 additionally decodes a CU merge inference flag (cu_merge_left_flag) and a CU merge level flag (cu_merge_level).

Herein, the CU merge inference flag is a flag indicating a reference location for inferring values, while the CU merge level flag is a flag for determining the information to be merged.

Subsequently, on the basis of the skip flag SKIP, the merge flag MRG_CU, the CU merge inference flag, and the CU merge level flag, the CU information inference unit 31 of the CU information decoder 12 decodes or infers the value of the PU split information SP_PU and the value of the prediction type information PType.

In further detail, the CU information inference unit 31 determines a CU to reference (the reference CU) according to the value of the CU merge inference flag (cu_merge_left_flag). Subsequently, in the case where the reference CU is an intra prediction CU (that is, the PredMode is MODE_INTRA), the value of the intra split flag (intra_split_flag) for the reference CU is inferred to be the value of the intra split flag for the target CU.

Meanwhile, in the case where the reference CU is an inter prediction CU (that is, the PredMode is MODE_INTER), the value of the intra split for the target CU is set such that the size becomes closest to the PU with the smallest size among the PUs which are within the reference CU and which neighbor the edge of the boundary between the target CU and the neighboring reference CU.

Subsequently, the CU information decoder 12 outputs CU decoding information #21 to the PT information decoder 13. The CU decoding information #21 includes the value of the decoded skip flag SKIP, the value of the decoded merge flag MRG_CU (and in the case where the value of the merge flag MRG_CU is "1", the values of the decoded CU merge inference flag and CU merge level flag), the decoded or inferred value of the PU split information SP_PU, and the similarly decoded or inferred value of the prediction type information PType.

Also, the CU information decoder 12 outputs CU decoding information #22 to the TT information decoder 14. The CU decoding information #22 includes the value of the decoded skip flag SKIP, the value of the decoded merge flag MRG_CU (and in the case where the value of the merge flag MRG_CU is "1", the values of the decoded CU merge inference flag and CU merge level flag).

Also, the CU information decoder 12 outputs CU decoding information #23 to the CU image generator 15. The CU decoding information #23 includes the decoded or inferred values of the PU split information SP_PU and the prediction type information PType.

Next, processing in the CU information decoder 12 will be described with reference to FIGS. 5 and 6. FIG. 5 is a syntax table illustrating details of processing in the CU information decoder 12. Also, FIG. 6 is a diagram for explaining objects to merge in the CU information decoder 12, in which FIG. 6(a) is a diagram illustrating relationships between the merge flag as well as the CU merge level flag, and objects to decode, and FIG. 6(b) is a diagram illustrating relationships between the merge flag as well as the CU merge level flag, and objects to merge.

As illustrated in FIG. 5, the CU information decoder 12 first decodes the skip flag SKIP (skip_flag) included in the coding unit information CU (st501). Subsequently, if the value of the skip flag SKIP is "1" (st502), the process proceeds to the processing for a prediction unit PU (st503).

On the other hand, if the value of the skip flag SKIP is not "1", the merge flag MRG_CU (cu_merge_flag) is decoded (st504). Subsequently, if the value of the merge flag MRG_CU is "1", the CU information decoder 12 additionally decodes the CU merge inference flag (cu_merge_left_flag) and the CU merge level flag (cu_merge_level) (st505).

Next, the CU information inference unit 31 decodes or infers the prediction type information PType (pred_mode) (st506). Subsequently, in the case where the decoded or inferred prediction type information PType indicates intra prediction, the intra split flag (intra_split_flag) is decoded or inferred (st507).

On the other hand, in the case where the decoded or inferred prediction type information PType indicates inter prediction, the inter split flag (inter_partitioning_idc) is decoded or inferred (st508).

Subsequently, the process proceeds to the processing for a prediction unit PU (prediction_unit, st509) and the processing for a transform unit TU (transform_tree, st510).

Next, the flags that may be decoded or inferred will be described with reference to FIG. 6(a). In FIG. 6(a), "o" indicates that an object is decoded, "inf." indicates that an inferred value is used, and "-" indicates that an object is unnecessary, respectively.

As illustrated in FIG. 6(a), in the case where the value of the merge flag MRG_CU is "0", all flags that may be decoded or inferred in units of CUs are decoded. Meanwhile, in the case where the value of the merge flag MRG_CU is "1" and the value of the merge level flag is "0", the three objects pred_mode, prediction_unit, and transform_tree are decoded, while the two objects intra_split_flag and inter_partitinig_idc are inferred.

Meanwhile, in the case where the value of the merge flag MRG_CU is "1" and the value of the merge level flag is also "1", the two objects prediction_unit and transform_tree are decoded, while the three objects pred_mode, intra_split_flag and inter_partitinig_idc are inferred.

Also, the relationships between the merge flag MRG_CU as well as the CU merge level flag, and objects to merge, may also be like that illustrated in FIG. 6(b). In other words, in the case where the value of the merge flag MRG_CU is "1" and the value of the CU merge level flag is also "1", the two objects of the prediction unit (prediction_unit) and the transform unit (transform_unit(tree)) may be the objects to merge. Meanwhile, in the case where the value of the merge flag MRG_CU is "1" and the value of the CU merge level flag is "0", only the prediction unit (prediction_unit) may be the object to merge.

(PT Information Decoder 13)

The PT information decoder 13 decodes the CU decoding information #21 input from the CU information decoder 12, and generates PT decoding information #31. The generated PT decoding information #31 is then input into the CU image generator 15.

Described more specifically, the PT information decoder 13 decodes the merge flag MRG_PU (pu_merge_flag) included in the PT information PTI. Subsequently, if the value of the merge flag MRG_PU is "1", a PU merge inference flag (pu_merge_left_flag) and a PU merge level flag (pu_merge_level) are decoded.

Herein, the PU merge inference flag is a flag indicating a reference location for inferring values, while the PU merge level flag is a flag for determining the information to be merged.

Subsequently, on the basis of the merge flag MRG_CU, the CU merge inference flag, the CU merge level flag, the merge flag MRG_PU, the PU merge inference flag, and the PU merge level flag, the PT information inference unit 32 of the PT information decoder 13 decodes or infers the value of the intra prediction mode IPM (prev_intra_luma_pred_flag, rem_intra_luma_pred_mode), the value of the inter prediction type IPT (inter_pred_idc), the value of the motion vector prediction method MVP (mvp_idx_lX), the value of the motion vector residual MVD (mvd_lX), the value of the reference image RI (ref_idx_lX), and the value of the weighted prediction coefficients (weighted_pred_param).

In further detail, the PT information inference unit 32 determines a PU to reference (the reference PU) according to the value of the PU merge inference flag (pu_merge_left_flag). Subsequently, in the case where the reference PU belongs to an intra prediction CU, the value of the intra prediction mode (intra_mode) for the reference CU inferred to be the value of the intra prediction mode for the target PU.

Meanwhile, in the case where the reference PU belongs to an inter prediction CU, a value indicating the default intra prediction mode (for example, the DC prediction mode) is set as the value of the intra prediction mode for the target PU.

Herein, the intra prediction mode is expressed inside encoded data by the combination of a flag indicating a match between the intra prediction mode and the inferred value (prev_intra_luma_pred_flag), and the residual of the intra prediction mode (rem_intra_luma_pred_mode). In the above inference of the intra prediction mode, the intra prediction mode may be directly inferred, but may also be indirectly inferred by inferring the prev_intra_luma_pred_flag and the rem_intra_luma_pred_mode.

Subsequently, the PT information decoder 13 generates a motion vector MV on the basis of the motion vector prediction method MVP and the motion vector residual MVD. Subsequently, the PT information decoder 13 outputs PT decoding information #32 to the CU image generator 15. The PT decoding information #32 includes the intra prediction mode IPM, the inter prediction type IPT, the motion vector MV, the reference image RI, and the weighted prediction coefficients.

Next, processing in the PT information decoder 13 will be described with reference to FIGS. 7 and 8. FIG. 7 is a syntax table illustrating details of processing in the PT information decoder 13. Also, FIG. 8 is a diagram for explaining objects to merge in the PT information decoder 13, in which FIG. 8(a) is a diagram illustrating relationships between the merge flag as well as the PU merge level flag, and objects to decode, and FIGS. 8(b) and 8(c) are diagrams illustrating relationships between the merge flag as well as the PU merge level flag, and objects to merge.

As illustrated in FIG. 7, if the value of the skip flag SKIP is "1" (st701), the PT information decoder 13 decodes the motion vector estimation method (mv_preditor( )) (st702). Note that mv_preditor( ) is a higher-level conceptualization of mvp_idc_lX.

On the other hand, if the value of the skip flag SKIP is not "1", the PT information decoder 13 checks the merge flag MRG_CU, and if the value of the merge flag MRG_CU is "1", the values of the merge flag MRG_PU and the PU merge inference flag are taken to be the same as the values of the merge flag MRG_CU and the CU merge inference flag. Also, if the prediction type information PType is inter prediction, the value of the PU merge level flag is taken to be the same as the value of the CU merge level flag (st703).

Also, if the value of the merge flag MRG_CU is not "1", the merge flag MRG_PU (pu_merge_flag) is decoded. Subsequently, if the value of the merge flag MRG_PU is "1", the PU merge inference flag (pu_merge_left_flag) and the PU merge level flag (pu_merge_level) are decoded (st704).

Next, if the prediction type information PType is intra prediction, the PT information decoder 13 decodes or infers the intra prediction mode (intra_mode) (st705).

Meanwhile, if the prediction type information PType is inter prediction, the inter prediction type IPT (inter_pred_idc), the motion vector prediction method MVP (mv_predictor( )), and the weighted prediction coefficients (weighted_pred_param( )) are decoded or inferred (st706).

Subsequently, the PT information decoder 13 decodes or infers the motion vector residual MVD (mv_defference( )) and the reference image RI (ref_pictre( )) (st707), and ends the process.

Note that mv_difference( ) is a higher-level conceptualization of mvd_lX, and reg_picture( ) is a higher-level conceptualization of ref_idx_lX.

Next, the flags that may be decoded or inferred will be described with reference to FIG. 8(a). In FIG. 8(a), "o" indicates that an object is decoded, "inf." indicates that an inferred value is used, "def." indicates that a default value is used, and "-" indicates that an object is unnecessary, respectively.

As illustrated in FIG. 8(a), in the case where the value of the merge flag MRG_PU is "0", all flags that may be decoded or inferred in units of PUs are decoded.

Also, in the case of intra prediction, if the value of the merge flag MRG_PU is "1", the merge_left_flag is decoded, while the two objects prev_intra_luma_pred_flag and rem_intra_luma_pred_mode are inferred.

Meanwhile, in the case of inter prediction, if the value of the merge flag MRG_PU is "1" and the value of the PU merge level flag is "0", the three objects merge_left_flag, inter_pred_idc, and mvd_idx_lX are decoded, mvd_lX is given a default value, and the two objects ref_idx_lX and weighted_pred_param are inferred.

Also, if the value of the merge flag MRG_PU is "1" and the value of the PU merge level flag is also "1", the merge_left_flag is decoded, mvd_lX is given a default value, and the four objects inter_pred_idc, mvd_idx_lX, ref_idx_lX, and weighted_pred_param are inferred.

Also, the relationships between the merge flag MRG_PU as well as the PU merge level flag, and objects to merge, may also be like that illustrated in FIG. 8(b). In other words, in the case where the value of the merge flag MRG_PU is "1" and the value of the PU merge level flag is also "1", the three objects of the motion information (the motion vector prediction method (mvd_idx_lX) and the motion vector residual (mvd_lX)), the transform type (transform_type), and the transform coefficients (transform_coeff) may be treated as objects to merge. Meanwhile, in the case where the value of the merge flag MRG_PU is "1" and the value of the PU merge level flag is "0", only the motion information may be treated as the object to merge.

Note that, as illustrated in FIG. 8(a) and FIG. 8(b), there is an advantage of implementation becoming easy in the case where the objects to merge in each merge level exist in an inclusion relation across different merge levels. However, such inclusion relations are not necessarily a requirement. By not using inclusion relations, there is improved freedom in combining objects to merge in each level, and the bit rate may be further reduced in some cases.

For example, the configuration may be like that illustrated in FIG. 8(c), such that in the case where the merge level is "2", "motion information" and "transform coefficients" become the objects to merge, whereas in the case where the merge level is "1", "motion information" becomes the object to merge, and in the case where the merge level is "0", "transform coefficients" become the object to merge.

According to a configuration like the above, it is possible to accommodate cases in which an area with a strong edge exists. This is because in an area with a strong edge, the edge sometimes still remains in the prediction residual, and in this case, not merging the transform coefficients is preferable. In addition, it is also possible to accommodate cases in which using a motion vector that differs from the actual motion of an object results in a smaller prediction residual in a flat area. This is because in such cases, not merging the motion information is preferable, even if the transform coefficients are merged.

(TT Information Decoder 14)

The TT information decoder 14 decodes the CU decoding information #22 input from the CU information decoder 12, and generates TT decoding information #41. The generated TT decoding information #41 is then input into the CU image generator 15.

Described more specifically, the TT information decoder 14 decodes the merge flag MRG_TU (tu_merge_flag) included in the TT information TTI. Subsequently, if the value of the merge flag MRG_TU is "1", a TU merge inference flag (tu_merge_left_flag) and a TU merge level flag (tu_merge_level) are decoded.

Herein, the TU merge inference flag is a flag indicating a reference location for inferring values, while the TU merge level flag is a flag for determining the information to be merged.

Subsequently, on the basis of the merge flag MRG_CU, the CU merge inference flag, the CU merge level flag, the merge flag MRG_TU, the TU merge inference flag, and the TU merge level flag, the TT information inference unit 33 of the TT information decoder 14 decodes or infers the transform size TTS (split_transform_flag), the presence indicator CBP for transform coefficients in the spatial domain (cbp_luma/cb/cr, coded_block_flag_luma/cb/cr), and the presence indicator CTC for transform coefficients in the frequency domain (coded_trans_coeff_pattern).

In further detail, the TT information inference unit 33 sets a reference direction according to the value of the TU merge inference flag (tu_merge_left_flag). Subsequently, the value of the transform size TTS (split_transform_flag) for the target TTS is set such that the two TUs neighboring along the reference direction have the same transform size.

Also, for the presence indicator CBP for transform coefficients in the spatial domain, the TT information decoder 14 sets a reference direction according to the value of the TU merge inference flag (tu_merge_left_flag), and sets the values of cbp_luma/cb/cr and coded_block_flag_luma/cb/cr such that the presence indicators for transform coefficients match in the two TUs neighboring along the reference direction.

Note that coded_block_flag_luma/cb/cr is a flag that is encoded for each node that is not split, or in other words, each TU, and indicates the presence or absence of luma or chroma transform coefficients within a TU. On the other hand, cbp_luma/cb/cr is grouped information that is encoded for each node that is split, or in other words, the nodes other than the TUs, and indicates the presence or absence of luma or chroma transform coefficients in each area after splitting. The coded_block_flag_luma/cb/cr may be directly derived from the presence indicator CBP for transform coefficients in the spatial domain inferred for each TU. The cbp_luma/cb/cr may be indirectly derived on the basis of the presence indicator CBP for transform coefficients in the spatial domain inferred for each TU.

Also, for the presence indicator CTC for transform coefficients in the frequency domain, the TT information decoder 14 first sets a reference TU according to the value of the TU merge inference flag (tu_merge_left_flag). Subsequently, in the case where the reference TU and the target TU differ in size, information indicating to decode the transform coefficients corresponding to all frequency components is set in the target TU.

Also, a process like the following may be conducted. The frequency domain is split into default units (for example, into quadrants like the Japanese character "ta"), and the following process is respectively applied to each unit. (1) In the case where transform coefficients exist within the target unit in the frequency domain of the reference TU, information indicating to decode the transform coefficients within the target unit in the frequency domain of the target TU is set in the target TU. (2) In all other cases, information indicating to not decode the transform coefficients within the target unit in the frequency domain of the target TU is set in the target TU.

Note that the determination of whether or not transform coefficients exist within a target unit in the frequency domain of a target TU may be made with reference to the CTC.

Also, more specifically, the following process may be conducted.

(1) In the case where the size of the target frequency domain is 16×16 or greater, that is, in the case where $$\max(\log 2 TrafoWidth, \log 2 TrafoHeight) > 3$$

a presence indicator for transform coefficients is decoded or inferred for every partial unit CG (Coeff Group) obtained by splitting that target frequency domain.

(2) Inference or decoding is selected according to the following conditions.

In the case where (a) DC is included in the target partial unit, or in the case where (b) the target partial unit is the last partial unit in the processing order in the target frequency domain, or in the case where (c) non-zero transform coefficients are included in both the partial unit neighboring on the right side of the target partial unit as well as the partial unit neighboring below the target partial unit, or in other words, in the case where $$(i == numLastSubset) || (rightCGFlag + bottomCGFlag == 2) || (i == 0)$$

is satisfied, among the CTC, non-zero transform coefficients are inferred to exist for the target partial unit, whereas in all other cases, among the CTC, non-zero transform coefficient presence information is decoded for the target partial unit.

Subsequently, the TT information decoder 14 outputs TT decoding information #41 to the CU image generator 15. The TT decoding information #41 includes the transform size TTS and transform coefficients decoded or inferred on the basis of the information about the presence or absence of transform coefficients (TTC, CBP).

Next, processing in the TT information decoder 14 will be described with reference to FIGS. 9 to 12.

FIGS. 9 to 11 are syntax tables illustrating details of processing in the TT information decoder 14. Also, FIG. 12 is a diagram for explaining objects to merge or skip in the TT information decoder 14, in which FIG. 12(a) is a diagram illustrating relationships between the merge flag as well as the PU merge level flag, and objects to decode, and FIG. 12(b) is a diagram illustrating relationships between the a skip flag (TU_skip_flag) as well as a TU skip level flag (TU_skip_level), and objects to skip.

As illustrated in FIG. 9, in the case where the value of the merge flag MRG_CU is "1", the TT information decoder 14 takes the values of the merge flag MRG_TU and the TU merge inference flag to be the values of the merge flag MRG_CU and the CU merge inference flag. Also, if the prediction type information PType is inter prediction, the value of the TU merge level flag is taken to be the same as the value of the CU merge level flag (st901).

Also, if the value of the merge flag MRG_CU is not "1", the merge flag MRG_TU (tu_merge_flag) is decoded. Subsequently, if the value of the merge flag MRG_TU is "1", the TU merge inference flag (tu_merge_left_flag) and the TU merge level flag (tu_merge_level) are decoded (st902).

Next, the TT information decoder 14 decodes the transform type TTType (transform_type) (st903), and the process is divided into the case of CABAC (st904) and the case of LCEC (st905), depending on the coding mode information.

FIG. 10(a) illustrates a syntax table for the case in which the coding mode information indicates CABAC. As illustrated in FIG. 10(a), in the case of intra prediction, the TT information decoder 14 decodes transform coefficient presence information CV (no_resudual_data_flag) indicating whether or not transform coefficients are provided for each spatial domain (st1001). Subsequently, the transform size TTS is decoded or inferred (st1002), and in addition, the presence indicator CBP for transform coefficients in the spatial domain and the presence indicator CTC for transform coefficients in the frequency domain are decoded or inferred (st1003).

Note that, in the case where there exist blocks like those illustrated in FIG. 10(b), and the presence indicators for transform coefficients in each block are expressed as f0 to f3, the presence indicator CTC for transform coefficients in the frequency domain (coded_trans_coeff_pattern) becomes coded_trans_coeff_pattern=f0+(f1<<1)+(f2<<2)+(f3<<3).

FIG. 11 illustrates a syntax table for the case in which the coding mode information indicates LCEC. As illustrated in FIG. 11, in the case where the coding mode information is LCEC, the TT information decoder 14 decodes transform coefficient presence information LC (cbp_yuv_root) indicating whether or not transform coefficients are provided for each luma and chroma component (st1101). Subsequently, the presence indicator CBP for transform coefficients in the spatial domain is decoded or inferred (st1102), and the presence indicator CTC for transform coefficients in the frequency domain is decoded or inferred (st1103).

Next, the flags that may be decoded or inferred will be described with reference to FIG. 12(a). Note that in FIG. 12(a), "o" indicates that an object is decoded, "inf." indicates that an inferred value is used, "def." indicates that a default value is used, and "-" indicates that an object is unnecessary, respectively.

As illustrated in FIG. 12(a), in the case where the value of the merge flag MRG_TU is "0", the seven objects split_transform_flag, transform_type, cbp_luma, coded_block_flag_luma, cbp_cb/cr, coded_block_flag_cb/cr, and transform_coeff are decoded. Meanwhile, in the case where the value of the merge flag MRG_TU is "1" and the value of the TU merge level flag "0", the five objects split_transform_flag, tu_merge_left_flag, cbp_luma, coded_block_flag_luma, and transform_coeff are decoded, while the three objects transform_type, cbp_cb/cr, and coded_block_flag_cb/cr are inferred.

Meanwhile, in the case where the value of the merge flag MRG_TU is "1" and the value of the TU merge level flag is also "1", the four objects split_transform_flag, tu_merge_left_flag, cbp_luma, and coded_block_flag_luma are decoded, part of transform_coeff is decoded, and the four objects transform_type, cbp_cb/cr, coded_block_flag_cb/cr, and coded_trans_coeff_pattern are inferred.

Meanwhile, in the case where the value of the merge flag MRG_TU is "1" and the value of the TU merge level flag is "2", the one object tu_merge_left_flag is decoded, the six objects split_transform_flag, transform_type, cbp_luma, coded_block_flag_luma, cbp_cb/cr, and coded_block_flag_cb/cr are inferred, while transform_coeff takes a default value.

Also, the skip flag and skip level versus the objects to skip may be determined as illustrated in FIG. 12(b). Namely, in the case where the skip flag is "1" and the skip level is "2", the objects to skip may be taken to be the transform coefficients (all coefficients), whereas in the case where the skip flag is "1" and the skip level is "1", the objects to skip may be taken to be the transform coefficients (non-DC components), and in the case where the skip flag is "1" and the skip level is "0", the objects to skip may be taken to be the transform coefficients (high-frequency components).

As above, in the present embodiment, it is possible to merge presence indicators for transform coefficients in the frequency domain (coded_trans_coeff_pattern). Since transform coefficients in the frequency domain are spatially correlated, the above configuration enables a high-quality decoded image #2 to be decoded while reducing the bit rate of the encoded data #1.

(CU Image Generator 15)

The CU image generator 15 generates a CU image using the CU decoding information #23 input from the CU information decoder 12, and PT decoding information #31 input from the PT information decoder 13, and the TT decoding information #41 input from the TT information decoder 14. The generated CU decoded image #51 is then output to the TBLK image generator 16.

In further detail, the CU image generator 15 generates a predicted image on the basis of the PU split SP_PU included in the PT decoding information #31, and the prediction mode indicated by the prediction type information PType. Specifically, in the case where the prediction mode is intra prediction, a predicted image is generated on the basis of the intra prediction mode IPM as well as a decoded image P' input from the frame memory 21, whereas in the case where the prediction mode is inter prediction, a predicted image is generated on the basis of the inter prediction type IPT, a motion vector MV, a reference image RI, weighted prediction coefficients, and a decoded image P'.

Subsequently, a prediction residual is generated on the basis of the transform size TTS and the transform coefficients included in the TT decoding information #41. Lastly, the generated predicted image and prediction residual are added together to generate a CU decoded image #51.

(TBLK Image Generator 16)

The TBLK image generator 16 uses the CU decoded image #51 input from the CU image generator 15 to generate and output a decoded image #2.

(Frame Memory 21)

The decoded image #2 is recorded in the frame memory 21. In the case of decoding a target TBLK, decoded images corresponding to all TBLKs decoded prior to that target TBLK (for example, all preceding TBLKs in the raster scan order) are recorded in the frame memory 21.

(Merged Examples)

Figure 14:
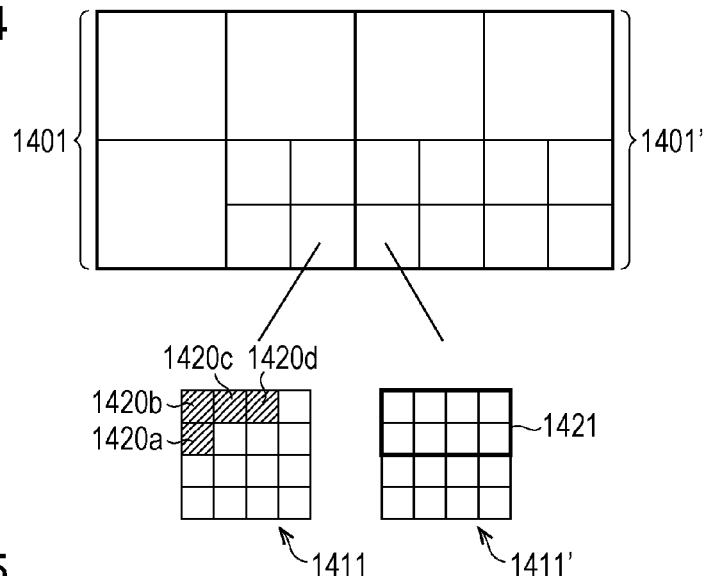
FIG. 14 is a diagram for explaining an example of merging.

Next, merged examples will be described with reference to FIGS. 13 and 14. FIG. 13 is a diagram for explaining the case of merging in units of CUs (the CU information CU and the PT information PTI). Also, FIG. 14 is a diagram for explaining the case of merging in units of TUs (the TTI information TTI).

FIG. 13 illustrates four CUs: a CU 1301, a CU 1302, a CU 1301', and a CU 1302'. Additionally, in the CU 1301, assume that the merge flag MRG_CU (cu_merge_flag) is "0", the PU split information SP_PU (intra_split_flag) is "0", and the intra prediction mode IPM is "DC prediction". Also, in the CU 1302, assume that the merge flag MRG_CU (cu_merge_flag) is "0", the PU split information SP_PU (intra_split_flag) is "1", and the intra prediction mode IPM is "horizontal prediction".

In the CU 1301, since the PU split information SP_PU (intra_split_flag) is "0", the PU becomes the same size as the CU without splitting the CU. On the other hand, in the CU 1302, since the PU split information SP_PU (intra_split_flag) is "1", the PUs become a quadtree subdivision of the CU.

Additionally, in the CU 1301', provided that the merge flag MRG_CU (cu_merge_flag) is "1" and the CU merge inference flag (cu_merge_left_gflag) is "1", in the CU 1301', the value of the PU split information SP_PU (intra_split_flag) is inferred to be "0" from the CU adjacent to the left. Also, the intra prediction mode IPM is likewise inferred to be "DC prediction" from the CU adjacent to the left. Thus, the CU 1301' is split into a PU similarly to the CU 1301.

Additionally, in the CU 1302', provided that the merge flag MRG_CU (cu_merge_flag) is "1" and the CU merge inference flag (cu_merge_left_gflag) is "1", in the CU 1301', the value of the PU split information SP_PU (intra_split_flag) is inferred to be "1" from the CU adjacent to the left. Also, the intra prediction mode IPM is likewise inferred to be "horizontal prediction" from the CU adjacent to the left. Thus, in the CU 1302', the PUs become a quadtree subdivision of the CU, similarly to the CU 1302.

Note that the objects to merge are not limited to information selecting direction prediction/DC prediction (prev_intra_luma_pred_flag, rem_intra_luma_pred_flag), and that information indicating whether or not to apply edge-based prediction, information indicating whether or not to apply planar prediction, information indicating whether or not to apply some other intra prediction method, parameters used in predicted image generation, and the like are also possible. Herein, edge-based prediction refers to prediction that utilizes an edge direction inferred on the basis of pixel values in the decoded image of a neighboring area and the intra prediction mode, whereas planar prediction refers to prediction that utilizes interpolation based on inferred values for the lower-right pixel value within a PU and pixel values in the decoded image of a PU adjacent area.

Also, the tree block split information SP_TBLK (split_coding_unit_flag), and not only the PU split information SP_PU, may also be an object to merge.

Next, the case of merging in units of TUs will be described. FIG. 14 illustrates two CUs: a CU 1401 and a CU 1401'. Additionally, in the CU 1401, assume that the merge flag MRG_TU (tu_merge_flag) is "0", the transform size TTS is "Y", the presence indicator CBP for transform coefficients in the spatial domain is "Y", and the transform coefficients TTC are "all frequency components".

Additionally, in the CU 1401', in the case where the value of the merge flag MRG_TU (tu_merge_flag) is "1" and the value of the TU merge inference flag (tu_merge_left_flag) is "1", for the TT information TTI of the CU 1401', the value is inferred from the CU adjacent to the left. Thus, in the CU 1401', the transform size TTS and the presence indicator CBP for transform coefficients in the spatial domain are copied from the CU 1401 and become the same values.

Also, for the transform coefficients TTC, all may be copied, or only some may be copied. For example, in cases such as where non-zero transform coefficients exist for pixels 1420a to 1420d in a PU 1411 belonging to the CU 1401, for a PU 1411' belonging to the CU 1401' to which those transform coefficients are to be copied, transform coefficients may be copied only into the area 1421 that includes the non-zero transform coefficients.

Note that the objects to merge may not only be the transform size TTS (split_transform_flag) and the presence indicators for transform coefficients in each spatial domain (no_residual_data_flag, cbp_luma/cb/cr, coded_block_flag_luma/cb/cr), but also presence indicators for transform coefficients for each luma/chroma component (cbp_yuv_root), and transform coefficients for specific frequency components.

As above, in the present embodiment, it is possible to merge information related to intra prediction (the prediction mode PType (pred_mode) and the intra prediction mode IPT (prev_intra_luma_pred_flag, rem_intra_luma_pred_mode)). Since information related to intra prediction is spatially correlated, the above configuration enables a high-quality decoded image #2 to be decoded while reducing the bit rate of the encoded data #1.

Also, in the present embodiment, it is possible to merge the weighted prediction coefficients (weighted_prede_param). Since weighted prediction coefficients are spatially correlated, the above configuration enables a high-quality decoded image #2 to be decoded while reducing the bit rate of the encoded data #1.

Also, in the present embodiment, it is possible to merge transform information such as the transform size TTS (split_transform_type) and the transform type TTType (transform_type). Since transform information is spatially correlated, the above configuration enables a high-quality decoded image #2 to be decoded while reducing the bit rate of the encoded data #1.

Also, in the present embodiment, it is possible to merge presence indicators for transform coefficients in the spatial domain (no_residual_data_flag, cbp_luma/cb/cr, coded_block_flag_luma/cb/cr). Since transform coefficients in the spatial domain are spatially correlated, the above configuration enables a high-quality decoded image #2 to be decoded while reducing the bit rate of the encoded data #1.

(Video Image Encoding Device 2)

Next, a video image encoding device (image decoding device) 2 will be described with reference to FIG. 15. Note that like signs are given to portions already described, and description of such portions will be reduced or omitted.

Generally speaking, the video image encoding device 2 is a device that generates and outputs an encoded image #1 by encoding an input image #100. In addition, the video image encoding device 2 is a video image encoding device, parts of which use technology implemented in the H.264/ MPEG-4 AVC standard, technology implemented in the KTA software, which is a jointly developed codec by the Video Coding Experts Group (VCEG), technology implemented in the Test Model under Consideration (TMuC) software, as well as the scheme implemented in the successor codec HEVC WD1.

Figure 15:
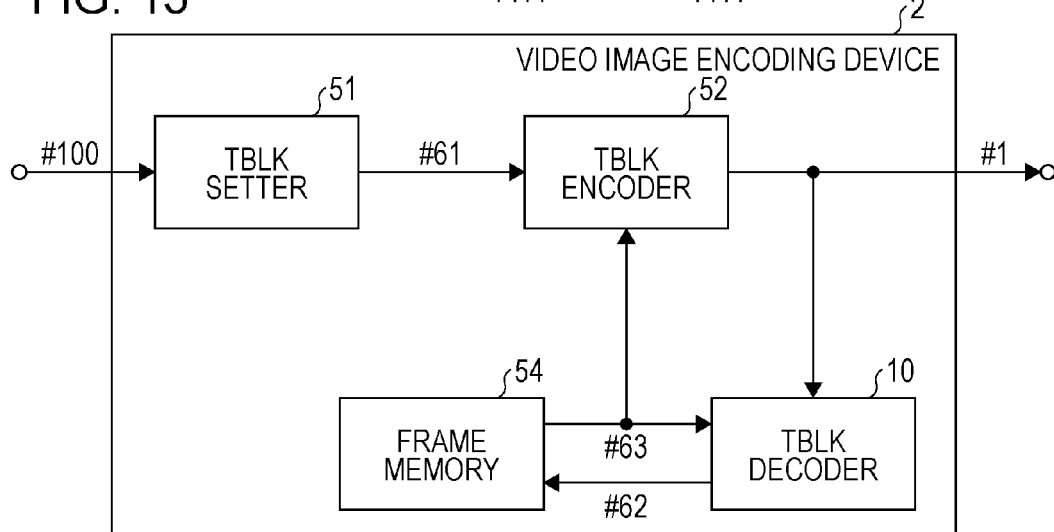
FIG. 15 is a block diagram illustrating a principal configuration of a video image encoding device according to the present embodiment.

FIG. 15 is a block diagram illustrating a principal configuration of the video image encoding device 2. As illustrated in FIG. 15, the video image encoding device 2 is configured to include a TBLK setter 51, a TBLK encoder (encoding means) 52, a TBLK decoder 10, and frame memory 54.

The TBLK setter 51 sets a TBKL structure on the basis of an input image #100. Specifically, parameters such as the sizes and shapes of TBLKs belonging to a target slice, as well as the positions within the target slice, and the sizes and shapes of CUs belonging to each TBLK, as well as the positions within the target TBLK. The information that is set, or set information #61, is then output to the TBLK encoder 52.

The TBLK encoder 52 encodes the input image #100 on the basis of the set information #61 input from the TBLK setter 51. In further detail, on the basis of the set information #61, the TBLK encoder 52 splits each tree block TBLK into coding units CU, prediction units PU, and transform units TU. Subsequently, a predicted image is generated for each prediction unit PU using a decoded image #63 being stored in the frame memory 54, and encoded data #1 is generated and output. The encoded data #1 is obtained by encoding transform coefficients, which are obtained by transforming the prediction residual, that is, the difference between an original image and a predicted image, for each transform unit TU, as well as side information other than transform coefficients.

Since the TBLK decoder 10 is similar to the TBLK decoder 10 of the video image decoding device 1, description herein is omitted.

An input decoded image #62 is recorded in the frame memory 54. In the case of encoding a target TBLK, decoded images corresponding to all TBLKs preceding that target TBLK in the raster scan order are recorded in the frame memory 54.

(Supplementary Note 1)

Note that in the foregoing embodiment, although the CU to reference in the case of merging is taken to be a CU adjacent on the left side of the target CU, the CU to reference is not limited thereto. For example, the CU to reference may also be a CU adjacent on the top side of the target CU, or a CU existing nearby, but not adjacent to the target CU. Also, a CU belonging to a previous frame is acceptable.

(Supplementary Note 2)

Also, although the foregoing embodiment describes the case in which merge flags and merge level flags are transmitted in the same information units, the configuration is not limited thereto. For example, the merge flag MRG_PU (pu_merge_flag) may be transmitted within the CU information CU, while the PU merge level flag (pu_merge_level_flag) may be transmitted within the PT information PTI. Also, the PU merge level flag (pu_merge_level_flag) may be transmitted within a slice S, while the merge flag MRG_PU (pu_merge_flag) may be transmitted within the PT information PTI.

Thus, since the layer may be changed to encode information, it is possible to reduce the side information, that is, the information excepting the prediction residual.

(Supplementary Note 3)

Also, a configuration that merges by utilizing a decoding history is also acceptable. In other words, an adaptive merge mode that utilizes a decoding history is provided, and the relevance between flags (syntax) of neighboring areas is measured while decoding. Then, flags whose relevance exceed a threshold may be treated as objects to merge.

Specifically, first, let syntax1 to syntaxM be flags (syntax) that may be merged in units of PUs by the adaptive merge mode.

Additionally, for syntaxk (where $1 \le k \le M$), relV(k) is set to 0. The function relV(k) indicates the strength of the relevance of syntax between vertically neighboring blocks. Also, relV(k) is set 0. The function relV(k) indicates the strength of the relevance of syntax between horizontally neighboring blocks. Also, cnt(k) is set to 0.

Then, if the adaptive merge mode is selected in the case of decoding the PT information PTI, flags satisfying the following condition are inferred by merging.

merge_k_flag=(rel$V(k)$/cnt$(k)$>$Th(k)$||rel$H(k)$/cnt$(k)$>$Th(k)$)?1:0

In the case of merging, the position of the PU to reference is taken to be above if relV(k)>relH(k), and to the left otherwise (information indicating the position of an object to merge is not decoded). Also, a corresponding flag is decoded in the case where the condition is not satisfied.

Lastly, for PU decoding, the following process is executed over k (where $1 \le k \le M$).

(1) In the case where syntaxk matches in the target PU and the above-neighboring PU: relV(k)+=1

(2) In the case where syntaxk matches in the target PU and the left-neighboring PU: relH(k)+=1

(3) cnt(k)+=1

(Supplementary Note 4)

Also, objects to merge may be sent in a header. This may encompass, for example, explicitly transmitting objects, selecting from default combinations, and transmitting only the objects for a specific level.

(Supplementary Note 5)

Merge levels may also be transmitted in the case where the size of a target CU, PU, or TU is greater than a default size.

(Supplementary Note 6)

Figure 16:
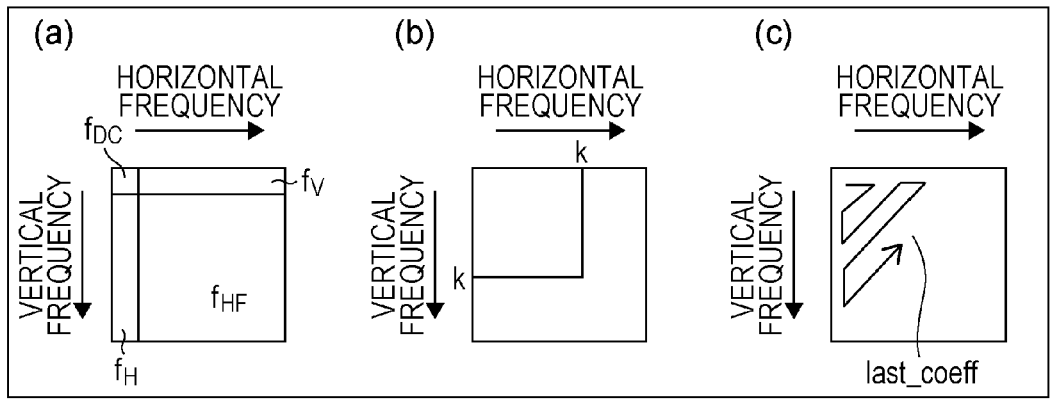
FIG. 16 is an explanatory diagram for expressing a presence indicator CTC for transform coefficients in the frequency domain, in which (a) is a diagram illustrating the case of expressing the CTC by splitting the frequency domain into non-square domains, (b) is a diagram illustrating the case of expressing the CTC by using a parameter, and (c) is a diagram illustrating the case of expressing the CTC by using a scan order.

Also, in the foregoing embodiment, the presence indicator for transform coefficients in the frequency domain (hereinafter designated the CTC) is taken to be a set of flags indicating whether or not transform coefficients are present in each partial frequency domain obtained by splitting the frequency domain as illustrated in FIG. 10(b). However, the following expression is also possible. The description will refer to FIG. 16. FIG. 16 is an explanatory diagram for expressing the presence indicator CTC for transform coefficients in the frequency domain, in which FIG. 16(a) is a diagram illustrating the case of expressing the CTC by splitting the frequency domain into non-square domains, FIG. 16(b) is a diagram illustrating the case of expressing the CTC by using a parameter, and FIG. 16(c) is a diagram illustrating the case of expressing the CTC by using a scan order.

(A) Expression by Splitting Frequency Domain into Non-Square Domains

Flags indicating whether or not transform coefficients are present in each domain obtained by splitting the frequency domain into non-square partial frequency domains may be set, and information collecting these flags may be treated as the CTC. For example, as illustrated in FIG. 16(a), the frequency domain is split into a DC portion, a horizontal edge portion (a domain in which the horizontal frequency component is large while the vertical frequency component is small), a vertical edge portion (a domain in which the vertical frequency component is large while the horizontal frequency component is small), and a high-frequency component (a domain in which the vertical and horizontal frequency components are both large). Presence indicators for transform coefficients in the respective domains are associated with the flags $f_{DC}$, $f_H$, $f_V$, and $f_{HF}$, which are then taken to be the CTC. In the case of applying such a CTC expression, inference in a merge process may be realized by copying a flag indicating whether or not transform coefficients are present in a corresponding partial frequency domain in the TU being referenced. Also, by not restricting the split frequency domains to square shapes, it becomes possible to more flexibly set the transform coefficient presence indicator flags.

(B) Parameter Expression

Using a frequency-related parameter to express a domain in which transform coefficients may be present within the frequency domain is also possible. As illustrated in FIG. 16(b), a parameter k is defined, with the value of k set in the CTC such that transform coefficients are contained within a partial frequency domain whose horizontal frequency component is between 0 and k inclusive, and whose vertical frequency component is between 0 and k inclusive. For example, in the case where the block size is 8×8 pixels, k=0 means that transform coefficients may be present in the DC component only, whereas the case of k=7 means that transform coefficients may be present in all frequency components. In the case of applying such a CTC expression, inference of the value k of the CTC in a target TU in a merge process may be derived according to k=Int(k'/r), where k' is the value of the CTC in the reference TU, and r is the size ratio of the reference TU versus the target TU. Herein, Int( ) is a function that retrieves the integer portion of an argument. With expression by a parameter, it becomes possible to express whether or not transform coefficients are present with finer precision compared to the case of simply splitting the frequency domain.

(C) Expressing Using Scan Order

A domain in which transform coefficients may be present within the frequency domain may be expressed by a potential range for a position (last_coeff) at which a transform coefficient last appears in a transform coefficient scan order. As illustrated in FIG. 16(c), last_coeff is defined as the position at which a transform coefficient last appears in the case where transform coefficients are scanned in the order indicated by the arrow in the frequency domain. In the case where the TU size is 8×8 pixels, last_coeff takes a value from 0 to 63. Since there is a possibility that transform coefficients are present only at positions from 0 to last_coeff in the scan order, deciding on a range for last_coeff enables the determination of a domain in which transform coefficients may be present. The potential range of last_coeff in a target TU in a merge process may be inferred as being from 0 to min(m'+α, b−1), where m' is the value of last_coeff in the reference TU. Herein, α is a value indicating change in the position of last_coeff, and is set to the width of the TU, for example. Also, b is the number of pixels included in the TU. According to this method, transform coefficients are able to be encoded while accounting for whether or not transform coefficients are present within the frequency domain without changing the scan order, making implementation easy.

The present invention is not limited to the foregoing embodiment, and various modifications are possible within the scope indicated by the claims. In other words, embodiments that may be obtained by combining technical means appropriately modified within the scope indicated by the claims are to be included within the technical scope of the present invention.

Exemplary Applications

The video image decoding device 1 and the video image encoding device 2 discussed above may be installed and utilized in various devices that transmit, receive, record, or playback video images. Note that a video image may be a natural video image recorded by a camera or the like, but may also be a synthetic video image (including CG and GUI images) generated by a computer or the like.

Figure 17:
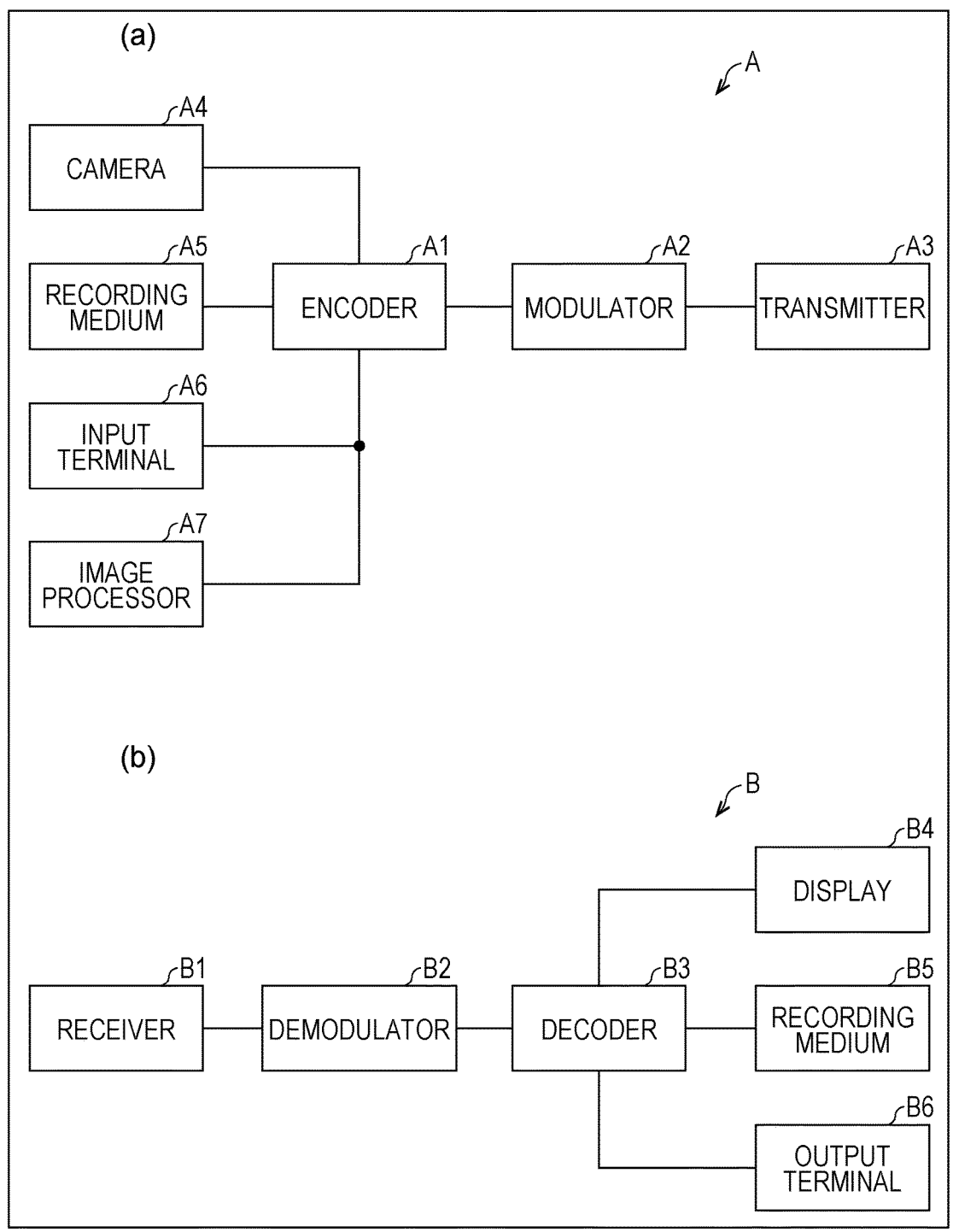
FIG. 17 is a diagram for explaining how a video image decoding device and a video image encoding device may be utilized to transmit and receive video images, in which (a) is a block diagram illustrating a configuration of a transmitting device equipped with a video image encoding device, and (b) and a block diagram illustrating a configuration of a receiving device equipped with a video image decoding device.

First, the ability to utilize the video image decoding device 1 and the video image encoding device 2 discussed above to transmit and receive a video image will be described with reference to FIG. 17.

FIG. 17(a) is a block diagram illustrating a configuration of a transmitting device A equipped with the video image encoding device 2. As illustrated in FIG. 17(a), the transmitting device A is equipped with an encoder A1 that obtains encoded data by encoding a video image, a modulator A2 that obtains a modulated signal by modulating a carrier wave with the encoded data obtained by the encoder A1, and a transmitter A3 that transmits the modulated signal obtained by the modulator A2. The video image encoding device 2 discussed earlier is used as the encoder A1.

As sources for supplying a video image to input into the encoder A1, the transmitting device A may be additionally equipped with a camera A4 that captures a video image, a recording medium A5 onto which a video image is recorded, an input terminal A6 for externally inputting a video image, and an image processor A7 that generates or processes an image. Although FIG. 17(a) exemplifies a transmitting device A equipped with all of the above, some may also be omitted.

Note that the recording medium A5 may be a medium recording an unencoded video image, or a medium recording a video image encoded with a coding scheme for recording that differs from the coding scheme for transmission. In the latter case, a decoder (not illustrated) that decodes encoded data read out from the recording medium A5 in accordance with the coding scheme for recording may be interposed between the recording medium A5 and the encoder A1.

FIG. 17(b) is a block diagram illustrating a configuration of a receiving device B equipped with the video image decoding device 1. As illustrated in FIG. 17(b), the receiving device B is equipped with a receiver B1 that receives a modulated signal, a demodulator B2 that obtains encoded data by demodulating a modulated signal received by the receiver B1, and a decoder B3 that obtains a video image by decoding encoded data obtained by the demodulator B2. The video image decoding device 1 discussed earlier is used as the decoder B3.

As destinations to supply with a video image output by the decoder B3, the receiving device B may be additionally equipped with a display B4 that displays a video image, a recording medium B5 for recording a video image, and an output terminal B6 for externally outputting a video image.

Although FIG. 17(b) exemplifies a receiving device B equipped with all of the above, some may also be omitted.

Note that the recording medium B5 may be a medium for recording an unencoded video image, or a medium for recording a video image encoded with a coding scheme for recording that differs from the coding scheme for transmission. In the latter case, an encoder (not illustrated) that encodes a video image acquired from the decoder B3 in accordance with the coding scheme for recording may be interposed between the decoder B3 and the recording medium B5.

Note that the transmission medium via which a modulated signal is transmitted may be wireless or wired. Also, the transmission format by which a modulated signal is transmitted may be broadcasting (herein indicating a transmission format in which a recipient is not specified in advance) or communication (herein indicating a transmission format in which a recipient is specified in advance). In other words, the transmission of a modulated signal may be realized by any of wireless transmission, wired transmission, wireless communication, and wired communication.

For example, a digital terrestrial broadcasting station (such as a broadcasting facility)/receiving station (such as a television receiver) is an example of a transmitting device A/receiving device B that transmits or receives a modulated signal by wireless broadcasting. Also, a cable television broadcasting station (such as a broadcasting facility)/receiving station (such as a television receiver) is an example of a transmitting device A/receiving device B that transmits or receives a modulated signal by wired broadcasting.

Also, a server (such as a workstation)/client (such as a television receiver, personal computer, or smartphone) for a service such as a video on demand (VOD) service or video sharing service using the Internet is an example of a transmitting device A/receiving device B that transmits or receives a modulated signal by communication (ordinarily, either a wireless or wired medium is used as the transmission medium in a LAN, while a wired medium is used as the transmission medium in a WAN). Herein, the term personal computer encompasses desktop PCs, laptop PCs, and tablet PCs. Also, the term smartphone encompasses multifunction mobile phone devices.

Note that a client of a video sharing service includes functions for decoding encoded data downloaded from a server and displaying the decoded data on a display, and additionally includes functions for encoding a video image captured with a camera and uploading the encoded data to a server. In other words, a client of a video sharing service functions as both the transmitting device A and the receiving device B.

Figure 18:
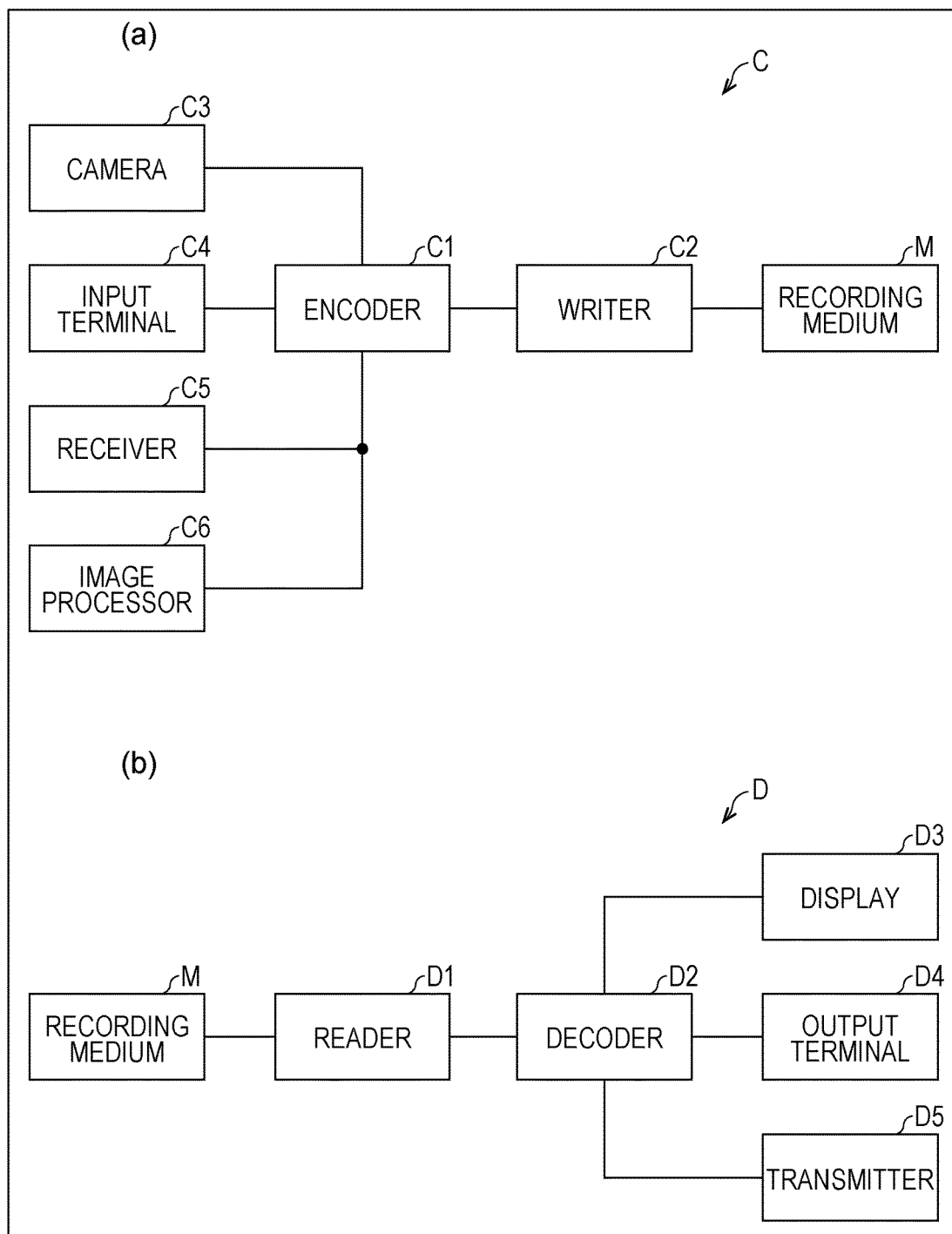
FIG. 18 is a diagram for explaining how a video image decoding device and a video image encoding device may be utilized to record and play back video images, in which (a) is a block diagram illustrating a configuration of a recording device equipped with a video image encoding device, and (b) is a block diagram illustrating a configuration of a playback device equipped with a video image decoding device.

Next, the ability to utilize the video image decoding device 1 and the video image encoding device 2 discussed earlier to recording and playback a video image will be described with reference to FIG. 18.

FIG. 18(a) is a block diagram illustrating a configuration of a recording device C equipped with the video image decoding device 1 discussed earlier. As illustrated in FIG. 18(a), the recording device C is equipped with an encoder C1 that obtains encoded data by encoding a video image, and a writer C2 that writes encoded data obtained by the encoder C1 to a recording medium M. The video image encoding device 2 discussed earlier is used as the encoder C1.

Note that the recording medium M may be (1) of a type that is built into the recording device C, such as a hard disk drive (HDD) or a solid-state drive (SSD), (2) of a type that is connected to the recording device C, such as an SD memory card or Universal Serial Bus (USB) flash memory, or (3) loaded into a drive device (not illustrated) built into the recording device C, such as a Digital Versatile Disc (DVD) or Blu-ray Disc (BD; registered trademark).

Also, as sources for supplying a video image to input into the encoder C1, the recording device C may be additionally equipped with a camera C3 that captures a video image, an input terminal C4 for externally inputting a video image, a receiver C5 for receiving a video image, and an image processor C6 that generates or processes an image. Although FIG. 18(a) exemplifies a recording device C equipped with all of the above, some may also be omitted.

Note that the receiver C5 may be a receiver that receives an unencoded video image, or a receiver that receives encoded data that has been encoded with a coding scheme for transmission that differs from the coding scheme for recording. In the latter case, a transmission decoder (not illustrated) that decodes encoded data that has been encoded with the coding scheme for transmission may be interposed between the receiver C5 and the encoder C1.

Potential examples of such a recording device C are, for example, a DVD recorder, a BD recorder, or a hard disk (HD) recorder (in this case, the input terminal C4 or the receiver C5 becomes the primary source for supplying video images). Also, devices such as a camcorder (in this case, the camera C3 becomes the primary source for supplying video images), a personal computer (in this case, the receiver C5 or the image processor C6 becomes the primary source for supplying video images), a smartphone (in this case, the camera C3 or the receiver C5 becomes the primary source for supplying video images) are also examples of such a recording device C.

FIG. 18(b) is a block diagram illustrating a configuration of a playback device D equipped with the video image decoding device 1 discussed earlier. As illustrated in FIG. 18(b), the playback device D is equipped with a reader D1 that reads out encoded data written to a recording medium M, and a decoder D2 that obtains a video image by decoding encoded data read out by the reader D1. The video image decoding device 1 discussed earlier is used as the decoder D2.

Note that the recording medium M may be (1) of a type that is built into the playback device D, such as an HDD or SSD, (2) of a type that is connected to the playback device D, such as an SD memory card or USB flash memory, or (3) loaded into a drive device (not illustrated) built into the playback device D, such as a DVD or BD.

Also, as destinations to supply with a video image output by the decoder D2, the playback device D may be additionally equipped with a display D3 that displays a video image, an output terminal D4 for externally outputting a video image, and a transmitter D5 that transmits a video image. Although FIG. 18(b) exemplifies a playback device D equipped with all of the above, some may also be omitted.

Note that the transmitter D5 may be a transmitter that transmits an unencoded video image, or a transmitter that transmits encoded data that has been encoded with a coding scheme for transmission that differs from the coding scheme for recording. In the latter case, an encoder (not illustrated) that encodes a video image with the coding scheme for transmission may be interposed between the decoder D2 and the transmitter D5.

Potential examples of such a playback device D are, for example, a DVD player, a BD player, or an HDD player (in this case, the output terminal D4 connected to a television receiver or the like becomes the primary destination to supply with video images). Also, devices such as a television receiver (in this case, the display D3 becomes the primary destination to supply with video images), a desktop PC (in this case, the output terminal D4 or the transmitter D5 becomes the primary destination to supply with video images), a laptop or tablet PC (in this case, the display D3 or the transmitter D5 becomes the primary destination to supply with video images), a smartphone (in this case, the display D3 or the transmitter D5 becomes the primary destination to supply with video images), and digital signage (also referred to as electronic signs or electronic billboards; the display D3 or the transmitter D5 becomes the primary destination to supply with video images) are also examples of such a playback device D.

(Configuration by Software)

Lastly, each block of the video image decoding device 1 and the video image encoding device 2 may be realized in hardware by logical circuits formed on an integrated circuit (IC chip), but may also be realized in software using a central processing unit (CPU).

In the latter case, the video image decoding device 1 and the video image encoding device 2 are equipped with a CPU that executes the commands of a control program that realizes respective functions, read-only memory (ROM) that stores the above program, random access memory (RAM) into which the above program is loaded, a storage device (recording medium) such as memory that stores the above program and various data, and the like. The object of the present invention is then achievable by supplying the above video image decoding device 1 and the video image encoding device 2 with a recording medium upon which is recorded, in computer-readable form, program code (a program in executable format, an intermediate code program, or source program) of the control program of the video image decoding device 1 and the video image encoding device 2 that is software realizing the functions discussed above, and by having that computer (or CPU or microprocessor unit (MPU)) read out and execute program code recorded on the recording medium.

For the above recording medium, a tape-based type such as magnetic tape or a cassette tape, a disk-based tape such as a floppy (registered trademark) disk/hard disk, and also including optical discs such as a Compact Disc-Read-Only Memory (CD-ROM)/magneto-optical (MO)/MiniDisc (MD)/Digital Versatile Disc (DVD)/CD-Recordable (CD-R) disc, a card-based type such as an IC card (including memory cards)/optical memory card, a semiconductor memory-based type such as mask ROM/erasable programmable read-only memory (EPROM)/electrically erasable and programmable read-only memory (EEPROM)/flash ROM, a logical circuit-based type such as a programmable logic device (PLD) or field-programmable gate array (FPGA), or the like may be used.

In addition, the video image decoding device 1 and the video image encoding device 2 may be configured to be connectable to a communication network, such that the above program code is supplied via a communication network. The communication network is not particularly limited, insofar as program code is able to be transmitted. For example, a network such as the Internet, an intranet, an extranet, a local area network (LAN), an Integrated Services Digital Network (ISDN), a value-added network (VAN), a community antenna television (CATV) communication network, a virtual private network, a telephone line network, a mobile communication network, or a satellite communication network is usable. Also, the transmission medium constituting the communication network is not limited to a specific configuration or type, insofar as program code is able to be transmitted. For example, a wired medium such as the Institute of Electrical and Electronic Engineers (IEEE) 1394, USB, power line carrier, cable TV line, telephone line, or asynchronous digital subscriber loop (ADSL), or a wireless medium such as infrared as in the Infrared Data Association (IrDA) or a remote control, Bluetooth (registered trademark), IEEE 802.11 wireless, High Data Rate (HDR), Near Field Communication (NFC), the Digital Living Network Alliance (DLNA), a mobile phone network, a satellite link, or a digital terrestrial network is usable. Note that the present invention may also be realized in the form of a computer data signal in which the above program code is embodied by electronic transmission, and embedded in a carrier wave.

(Supplementary Note 7)

The present invention may also be stated as follows.

An image decoding device according to the present invention is an image decoding device that decodes an image by decoding encoded data that includes encoded and quantized transform coefficients in which a prediction residual obtained by subtracting a predicted image from an original image is transformed and quantized per a transform unit, and the quantized transform coefficients are encoded. The image decoding device is equipped with decoding means that, in the case where the encoded data includes merge/skip information that merges or skips presence information indicating whether or not frequency-domain transform coefficients are included in the quantized transform coefficients, does not decode the presence information, and inferring means that, in the case where the encoded data includes merge/skip information that merges or skips the presence information, infers the presence information. The decoding means uses the presence information inferred by the inferring means to decode the encoded and quantized transform coefficients.

Herein, merging refers to omitting particular information necessary for decoding, with the information being estimated on the basis of information at a default or a specified position. Meanwhile, skipping refers to omitting particular information necessary for decoding, and using estimated values or default values instead.

According to the above configuration, decoding may be conducted by transmitting only merge/skip information, without transmitting information indicating whether or not frequency-domain transform coefficients are present.

Accordingly, since there is no need to transmit information indicating whether or not frequency-domain transform coefficients are present, which needed to be transmitted hitherto, further reducing the bit rate of encoded data compared to the past becomes possible.

In the image decoding device according to the present invention, the presence information may be information indicating whether or not non-zero transform coefficients are included in a component, excepting a direct current component, of frequency components in the quantized transform coefficients.

According to the above configuration, decoding may be conducted by transmitting only merge/skip information, without transmitting information indicating whether or not non-zero transform coefficients are included in a component, excepting a direct current component, of frequency components in the quantized transform coefficients.

The question of whether or not non-zero transform coefficients are included in a component excepting a direct current component has an extremely high spatial correlation, and there is a high probability of being able to infer accurately. Accordingly, a high-quality decoded image may be generated while reducing the bit rate of encoded data.

In the image decoding device according to the present invention, the presence information may be information indicating whether or not non-zero transform coefficients are included in a high-frequency component of frequency components in the quantized transform coefficients.

According to the above configuration, decoding may be conducted by transmitting only merge/skip information, without transmitting information indicating whether or not non-zero transform coefficients are included in a high-frequency component of frequency components in the quantized transform coefficients.

The question of whether or not non-zero transform coefficients are included in a high-frequency component of frequency components has an extremely high spatial correlation, and there is a high probability of being able to infer accurately. Accordingly, a high-quality decoded image may be generated while reducing the bit rate of encoded data.

In the image decoding device according to the present invention, the encoded data may also include merge/skip level information for selecting information to be merged or skipped.

According to the above configuration, information to be merged or skipped may be determined according to a merge/skip level. Accordingly, since the question of whether or not to merge or skip may be determined for each piece of information, the target of merging or skipping may be determined in conjunction with local properties.

In the image decoding device according to the present invention, in the merge/skip level information, information to be merged or skipped may exist in an inclusion relation according to level.

According to the above configuration, information to be merged or skipped exists in an inclusion relation according to level, thereby enabling simple implementation. Also, a process in the case of generating encoded data at an encoding device may be made common.

In the image decoding device according to the present invention, in the merge/skip level information, a shorter code may be assigned to the extent that a level contains more information to be merged or skipped.

According to the above configuration, since a shorter code is assigned to the extent that a level contains more information to be processed, the bit rate of encoded data may be further reduced.

In an image decoding device according to the present invention, the units by which the predicted image is generated, transformed, and encoded may respectively differ, the encoded data may include data per each of the units, and the merge/skip information and the merge/skip level information may be included in different units from among the units.

According to the above configuration, since merge/skip information and merge/skip level information is transmitted in different units, the bit rate of side information may be reduced.

Herein, side information refers to all information excepting the prediction residual.

In the image decoding device according to the present invention, the inferring means may also set a reference transform unit to reference in order to infer information to be merged/skipped, on the basis of a decoding result previously decoded by the decoding means.

According to the above configuration, the inferring means sets a reference transform unit using a previous decoding result. Additionally, there is a high probability that a previous decoding result is similar to the current decoding. Accordingly, a reference transform unit may be suitably set.

In the image decoding device according to the present invention, target information indicating information to be merged or skipped by the merge/skip information may be stored in a header portion of the encoded data.

According to the above configuration, a target to be merged or skipped may be suitably set.

In the image decoding device according to the present invention, the merge/skip level information may be included in the encoded data only in the case where a size of the units including information to be processed is greater than a threshold value.

According to the above configuration, merge/skip level information is not transmitted in the case where the size of a unit is small, and thus an increase in the side information in the case of a unit of small size may be prevented.

An image decoding device according to the present invention is an image decoding device that decodes an image by decoding encoded data that includes encoded and quantized transform coefficients in which a prediction residual obtained by subtracting a predicted image from an original image is transformed and quantized per a transform unit, and the quantized transform coefficients are encoded. The encoded data includes encoded transform information in which transform information used in the transform is encoded per the transform unit. The image decoding device is equipped with inferring means that, in the case where the encoded data includes merge/skip information that merges or skips the transform information and the quantized transform coefficients per the transform unit, infers the transform information and the quantized transform coefficients in that transform unit according to a method indicated by the merge/skip information.

According to the above configuration, merging or skipping may be conducted on a transform unit, and thus the bit rate of encoded data may be further reduced.

In order to solve the above problem, an image encoding device according to the present invention is an image encoding device that outputs encoded data that includes encoded and quantized transform coefficients in which a prediction residual obtained by subtracting a predicted image from an original image is transformed and quantized per a transform unit, and the quantized transform coefficients are encoded. The image encoding device is equipped with encoding means that includes, in the encoded data, merge/skip information that merges or skips presence information indicating whether or not frequency-domain transform coefficients are included in the quantized transform coefficients.

According to the above configuration, there is output encoded data that includes only merge/skip information, without including information indicating whether or not frequency-domain transform coefficients are present.

Accordingly, since there is no need to include, in the encoded data, information indicating whether or not frequency-domain transform coefficients are present, which needed to be output hitherto, further reducing the bit rate of encoded data compared to the past becomes possible.

A data structure of encoded data according to the present invention is a data structure of encoded data that includes encoded and quantized transform coefficients in which a prediction residual obtained by subtracting a predicted image from an original image is transformed and quantized per a transform unit, and the quantized transform coefficients are encoded. The data structure includes merge/skip information that merges or skips presence information indicating whether or not frequency-domain transform coefficients are included in the quantized transform coefficients.

According to the above configuration, encoded data includes only merge/skip information, without including information indicating whether or not frequency-domain transform coefficients are present.

Accordingly, since there is no need to include, in the encoded data, information indicating whether or not frequency-domain transform coefficients are present, which was necessary hitherto, further reducing the bit rate of encoded data compared to the past becomes possible.

INDUSTRIAL APPLICABILITY

The present invention may be suitably applied to an image decoding device that decodes encoded data, and to an image encoding device that generates encoded data. The present invention may also be suitably applied to a data structure of encoded data that is generated by an image encoding device and referenced by an image decoding device.

REFERENCE SIGNS LIST 1 video image decoding device (image decoding device)
2 video image encoding device (image encoding device)
10 TBLK decoder (decoding means)
11 TBLK information decoder
12 CU information decoder
13 PT information decoder
14 TT information decoder (decoding means)
15 CU image generator
16 TBLK image generator
31 CU information inference unit
32 PT information inference unit
33 TT information inference unit (inferencing means)
52 TBLK encoder (encoding means)

The invention claimed is:

1. An image decoding device that decodes an image by decoding, per a decoding unit, encoded data that includes encoded data of a first block of quantized transform coefficients in which a prediction residual obtained by subtracting a predicted image from an original image is transformed and quantized per a transform unit, and the first block of quantized transform coefficients with a size of the transform unit are encoded, the image decoding device comprising:

a first decoding circuit that decodes by inferring non-zero transform coefficient presence information indicating whether or not non-zero transform coefficients are included in a second block of quantized transform coefficients with a size of a partial unit, a second decoding circuit that decodes the non-zero transform coefficient presence information from the encoded data, and a third decoding circuit that decodes the quantized transform coefficients, wherein the second block of quantized transform coefficients is obtained by splitting the first block of the quantized transform coefficients and consists of 4 quantized transform coefficients×4 quantized transform coefficients, in a case where a target second block is, in a processing order, the second block lastly processed in a corresponding transform unit, the first decoding circuit infers that the target second block includes the non-zero transform coefficients, and in the case where the non-zero transform coefficient presence information indicates that non-zero transform coefficients are present within the second block, the third decoding circuit decodes quantized transform coefficients within that second block from the encoded data.

2. An image encoding device that outputs encoded data that includes encoded data of a first block of quantized transform coefficients in which a prediction residual obtained by subtracting a predicted image from an original image is transformed and quantized per a transform unit, and the first block of quantized transform coefficients are encoded, the image encoding device comprising:

a first encoding circuit that encodes by merging or skipping non-zero transform coefficient presence information indicating whether or not non-zero transform coefficients are included in a partial unit, a second encoding circuit that encodes the non-zero transform coefficient presence information, and a third encoding circuit that encodes the quantized transform coefficients, wherein the second block of quantized transform coefficients is obtained by splitting the first block of quantized transform coefficients and consists of 4 quantized transform coefficients×4 quantized transform coefficients, in a case where a target partial unit is, in a processing order, a last partial unit in a corresponding transform unit, the first encoding circuit encodes information for skipping non-zero transform coefficient presence information which corresponds to the target partial unit, and in the case where the non-zero transform coefficient presence information indicates that non-zero transform coefficients are present within the second block, the third encoding circuit encodes quantized transform coefficients within that second block from the encoded data.

3. A non-transitory computer-readable storage medium storing a control program for causing a computer to operate as the image decoding device recited in claim 1, the control program causing the computer to serve as each of the first decoding circuit, the second decoding circuit, and the third decoding circuit of the image decoding device.

4. A non-transitory computer-readable storage medium storing a control program for causing a computer to operate as the image encoding device recited in claim 2, the control program causing the computer to serve as each of the first encoding circuit, the second encoding circuit, and the third encoding circuit of the image encoding device.

5. An image decoding method that decodes an image by decoding, per a decoding unit, encoded data that includes encoded data of a first block of quantized transform coefficients in which a prediction residual obtained by subtracting a predicted image from an original image is transformed and quantized per a transform unit, and the first block of quantized transform coefficients with a size of the transform unit are encoded, the image decoding method comprising:

a first decoding step that decodes by inferring non-zero transform coefficient presence information indicating whether or not non-zero transform coefficients are included in a second block of quantized transform coefficients with a size of a partial unit, a second decoding step that decodes the non-zero transform coefficient presence information from the encoded data, and a third decoding step that decodes the quantized transform coefficients, wherein the second block of quantized transform coefficients is obtained by splitting the first block of the quantized transform coefficients and consists of 4 quantized transform coefficients×4 quantized transform coefficients, in a case where a target second block is, in a processing order, the second block lastly processed in a corresponding transform unit, it is inferred, in the first decoding step, that the target second block includes the non-zero transform coefficients, and in the case where the non-zero transform coefficient presence information indicates that non-zero transform coefficients are present within the second block, the third decoding step decodes quantized transform coefficients within that second block from the encoded data.

6. An image encoding method that outputs encoded data that includes encoded data of a first block of quantized transform coefficients in which a prediction residual obtained by subtracting a predicted image from an original image is transformed and quantized per a transform unit, and the first block of quantized transform coefficients are encoded, the image encoding method comprising:

a first encoding step that encodes by merging or skipping non-zero transform coefficient presence information indicating whether or not non-zero transform coefficients are included in a partial unit, a second encoding step that encodes the non-zero transform coefficient presence information, and a third encoding step that encodes the quantized transform coefficients, wherein the second block of quantized transform coefficients is obtained by splitting the first block of quantized transform coefficients and consists of 4 quantized transform coefficients×4 quantized transform coefficients, in a case where a target partial unit is, in a processing order, a last partial unit in a corresponding transform unit, information for skipping non-zero transform coefficient presence information which corresponds to the target partial unit is encoded in the first encoding step, and in the case where the non-zero transform coefficient presence information indicates that non-zero transform coefficients are present within the second block, the third encoding step encodes quantized transform coefficients within that second block from the encoded data.

* * * * *